(12) United States Patent
Damnjanovic et al.

(10) Patent No.: US 9,867,055 B2
(45) Date of Patent: Jan. 9, 2018

(54) TECHNIQUES FOR COORDINATING COMMUNICATIONS OVER AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Naga Bhushan, San Diego, CA (US); Durga Prasad Malladi, San Diego, CA (US); Yongbin Wei, La Jolla, CA (US); Kiran Kumar Somasundaram, San Diego, CA (US); Wanshi Chen, San Diego, CA (US); Peter Gaal, San Diego, CA (US); Tao Luo, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 14/685,051

(22) Filed: Apr. 13, 2015

(65) Prior Publication Data
US 2015/0319781 A1 Nov. 5, 2015

Related U.S. Application Data

(60) Provisional application No. 61/986,734, filed on Apr. 30, 2014.

(51) Int. Cl.
*H04L 1/00* (2006.01)
*H04W 16/14* (2009.01)
(Continued)

(52) U.S. Cl.
CPC .......... *H04W 16/14* (2013.01); *H04J 3/1694* (2013.01); *H04W 72/044* (2013.01); *H04W 74/08* (2013.01)

(58) Field of Classification Search
CPC ........ H04B 17/00; H04B 3/46; H04B 7/2121; H04B 7/2123; H04L 43/00; H04L 43/50;
(Continued)

(56) References Cited

U.S. PATENT DOCUMENTS

| 2012/0294233 A1 | 11/2012 | Radunovic et al. | |
| 2013/0294356 A1* | 11/2013 | Bala | H04W 16/14 370/329 |
| 2013/0338019 A1* | 12/2013 | Abbas | C12Q 1/6883 506/9 |

OTHER PUBLICATIONS

ETSI, "Broadband Radio Access Networks (BRAN); 5 GHz High Performance RLAN; Harmonized EN Covering the Essential Requirements of Article 3.2 of the R&TTE Directive," ETSI EN 301 893 V1.8.0_0.0.7 (Feb. 2014), Feb. 2014, 93 pgs., XP_14196459A, the European Telecommunications Standards Institute, Sophia Antipolis Cedex, France.
(Continued)

*Primary Examiner* — Dady Chery
(74) *Attorney, Agent, or Firm* — Holland & Hart LLP

(57) ABSTRACT

Techniques are described for wireless communication. One method includes identifying, by a first transmitter, a first contention access protocol timing for accessing an unlicensed radio frequency spectrum band, and aligning a second contention access protocol timing with the first contention access protocol timing, the second contention access protocol timing being used by the first transmitter for accessing the unlicensed radio frequency spectrum band.

32 Claims, 19 Drawing Sheets

(51) Int. Cl.
*H04W 74/08* (2009.01)
*H04J 3/16* (2006.01)
*H04W 72/04* (2009.01)

(58) Field of Classification Search
CPC ....... H04L 41/04; H04L 41/085; H04L 41/12;
H04L 45/02; H04W 24/00; H04W 84/18;
H04W 72/04; H04W 72/12; H04W 76/00;
H04J 2203/0069; H04Q 2213/394
USPC .......................... 370/252, 254, 329, 330, 332
See application file for complete search history.

(56) References Cited

OTHER PUBLICATIONS

Goldhamer, "Topics Related to EN 301 893," IAESI, submitted to BRAN-RCWG, ETSI TC BRAN, BRAN(14)000020, Feb. 4, 2014, 4 pgs., XP_14196443A, the European Telecommunications Standards Institute, Sophia Antipolis Cedex, France.
ISA/EPO, International Search Report and Written Opinion of the International Searching Authority, Int'l. App. No. PCT/US2015/025648, dated Feb. 3, 2016, European Patent Office, Rijswijk, NL, 8 pgs.
ISA/EPO, International Search Report and Written Opinion of the International Searching Authority, Int'l. App. No. PCT/US2015/025648, dated Apr. 25, 2016, European Patent Office, Rijswijk, NL, 20 pgs.

* cited by examiner

TECHNIQUES FOR COORDINATING COMMUNICATIONS OVER AN UNLICENSED RADIO FREQUENCY SPECTRUM BAND

CROSS REFERENCES

The present application for patent claims priority to U.S. Provisional Patent Application No. 61/986,734 by Damnjanovic et al., entitled "Techniques for Coordinating Communications Over an Unlicensed Radio Frequency Spectrum Band," filed Apr. 30, 2014, assigned to the assignee hereof, which is hereby incorporated by reference in its entirety.

FIELD OF THE DISCLOSURE

The present disclosure, for example, relates to wireless communication systems, and more particularly to techniques for coordinating communications over an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, implement a Listen Before Talk (LBT) protocol to gain access to the unlicensed radio frequency spectrum band. An LBT protocol may include performing a clear channel assessment (CCA) procedure to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA procedure may be performed for the channel again at a later time.

In some cases, transmissions by one or more nodes over an unlicensed radio frequency spectrum band (e.g., Wi-Fi nodes or nodes of other operators) may prevent a base station or UE from gaining access to the unlicensed radio frequency spectrum, resulting in the base station or UE being "starved" of use of the unlicensed radio frequency spectrum band. In some cases, this starvation problem may be mitigated by using an LBT protocol configured for load based equipment (LBT-LBE) instead of an LBT protocol configured for frame based equipment (LBT-FBE). In an LBT-LBE protocol, an extended CCA procedure comprising a plurality of N CCA procedures may be performed. The extended CCA procedure performed in conjunction with an LBT-LBE protocol may provide a base station or UE a better chance to gain access to an unlicensed radio frequency spectrum band (e.g., compared to a single CCA procedure performed in conjunction with an LBT-FBE protocol).

SUMMARY

The present disclosure, for example, relates to one or more techniques for coordinating communications over an unlicensed radio frequency spectrum band. The techniques may enable a first transmitter (e.g., an evolved Node B (eNB) or a base station) to identify a first contention access protocol timing (e.g., a first LBT-LBE protocol timing) and align a second contention access protocol timing (e.g., an LBT-LBE protocol timing) to the first contention access protocol timing. The second contention access protocol timing may be used by the first transmitter to access an unlicensed radio frequency spectrum band. When other transmitters also align their contention access protocol timings with the first contention access protocol timing, all of the transmitters having their contention access protocol timings aligned may access the unlicensed radio frequency band in a coordinated manner, without preventing another of the transmitters from accessing the unlicensed radio frequency spectrum band.

In an example, a method for wireless communication is described. In one example, the method may include identifying, by a first transmitter, a first contention access protocol timing for accessing an unlicensed radio frequency spectrum band. The method may also include aligning a second contention access protocol timing with the first contention access protocol timing. The second contention access protocol timing may be used by the first transmitter for accessing the unlicensed radio frequency spectrum band.

In some examples, the aligning the second contention access protocol timing with the first contention access protocol timing may include adjusting a timing of radio frame transmissions by the first transmitter in the unlicensed radio frequency spectrum band based at least in part on the first contention access protocol timing. In some examples, the adjusting the timing of radio frame transmissions by the first transmitter may include adjusting a duration of at least one radio frame transmitted by the first transmitter to coincide with a radio frame duration indicated by the first contention access protocol timing, adjusting a radio frame ending of at least one radio frame transmitted by the first transmitter to coincide with a radio frame ending indicated by the first contention access protocol timing, shortening a duration of at least one radio frame transmitted by the first transmitter with respect to a radio frame duration indicated by the first contention access protocol timing, or skipping at least one radio frame transmission indicated by the first contention access protocol timing.

In some examples, the aligning the second contention access protocol timing with the first contention access protocol timing may include aligning a first timing of a first extended CCA procedure performed by the first transmitter with a second timing of a second extended CCA procedure indicated by the first contention access protocol timing. The first extended CCA procedure may be used by the first transmitter to access the unlicensed radio frequency spectrum band.

In some examples, the aligning the first timing of the first extended CCA procedure with the second timing of the second extended CCA procedure may include aligning a commencement of the first extended CCA procedure with a commencement of the second extended CCA procedure.

In some examples, the aligning the first timing of the first extended CCA procedure with the second timing of the second extended CCA procedure may include syncing a first random number generator on which the first extended CCA procedure is based with a second random number generator on which the second extended CCA procedure is based.

In some examples, the method may further include performing the first extended CCA procedure by the first transmitter and, when the first extended CCA procedure is successful, transmitting a virtual radio frame over the unlicensed radio frequency spectrum band by the first transmitter based at least in part on the second contention access protocol timing being aligned with the first contention access protocol timing. In some of these examples, the transmitting the virtual radio frame based at least in part on the second contention access protocol timing being aligned with the first contention access protocol timing may include transmitting a virtual radio frame having a shortened duration with respect to a radio frame duration indicated by the first contention access protocol timing.

In some examples, the method may further include performing the first extended CCA procedure by the first transmitter and, when the first extended CCA procedure is successful, determining whether transmission of a virtual radio frame over the unlicensed radio frequency spectrum band by the first transmitter will interfere with at least a second transmitter performing the first extended CCA procedure or a third extended CCA procedure. The third extended CCA procedure may be aligned with the first extended CCA procedure. The method may also include transmitting the virtual radio frame over the unlicensed radio frequency spectrum band by the first transmitter, after determining that transmission of the virtual radio frame over the unlicensed radio frequency spectrum band by the first transmitter will not interfere with at least the second transmitter performing the second extended CCA procedure or the third extended CCA procedure, based at least in part on the second contention access protocol timing being aligned with the first contention access protocol timing. In some examples, the determining whether transmission of a virtual radio frame over the unlicensed radio frequency spectrum band by the first transmitter will interfere with at least the second transmitter performing the first extended CCA procedure or the third extended CCA procedure may include syncing a first random number generator on which the first extended CCA procedure is based with a second random number generator on which the second extended CCA procedure is based. In some examples, the method may further include skipping virtual radio frame transmission until a subsequent successful CCA procedure after determining that transmission of the virtual radio frame over the unlicensed radio frequency spectrum band will interfere with at least the second transmitter performing the second extended CCA procedure or the third extended CCA procedure. In some examples, the method may further include skipping virtual radio frame transmission until a subsequent successful CCA procedure when the first extended CCA procedure fails.

In some examples, the aligning the first timing of the first extended CCA procedure with the second timing of the second extended CCA procedure may include aligning the first timing of the first extended CCA procedure with a synchronization boundary occurring once every M radio frames in the first contention access protocol timing. In some examples, M may be equal to one. In some examples, M may be an integer greater than one.

In some examples, the method may further include performing the first extended CCA procedure by the first transmitter, and indicating a success of the first extended CCA procedure to at least a second transmitter when the first extended CCA procedure is successful. In some examples, the success of the first extended CCA procedure may be indicated to at least the second transmitter via a backhaul to which the first transmitter and at least the second transmitter are connected.

In some examples, the first contention access protocol timing may be performed by a second transmitter. In some examples, the first transmitter and the second transmitter may be associated with a same operator. In some examples, the first contention access protocol timing may indicate a timing of virtual radio frame transmissions based at least in part on a continuum of successful extended CCA procedures and a fixed number of CCA procedures per extended CCA procedure.

In an example, an apparatus for wireless communication is described. In one example, the apparatus may include means for identifying, by a first transmitter, a first contention access protocol timing for accessing an unlicensed radio frequency spectrum band. The apparatus may also include means for aligning a second contention access protocol timing with the first contention access protocol timing. The second contention access protocol timing may be used by the first transmitter for accessing the unlicensed radio frequency spectrum band. In some examples, the apparatus may further include means for implementing one or more aspects of the method for wireless communication described above.

In an example, another apparatus for wireless communication is described. In one example, the apparatus may include a processor, memory in electronic communication with the processor, and instructions stored in the memory. The instructions may be executable by the processor to identify, by a first transmitter, a first contention access protocol timing for accessing an unlicensed radio frequency spectrum band. The instructions may also be executable by the processor to align a second contention access protocol timing with the first contention access protocol timing. The second contention access protocol timing may be used by the first transmitter for accessing the unlicensed radio frequency spectrum band. In some examples, the instructions may also be executable by the processor to implement one or more aspects of the method for wireless communication described above.

In an example, a non-transitory computer-readable medium storing computer-executable code for wireless communications is described. In one example, the code may be executable by at least one processor to identify, by a first transmitter, a first contention access protocol timing for accessing an unlicensed radio frequency spectrum band. The code may also be executable by the at least one processor to align a second contention access protocol timing with the first contention access protocol timing. The second contention access protocol timing may be used by the first transmitter for accessing the unlicensed radio frequency spectrum band. In some examples, the code may also be executable by the at least one processor to implement one or more aspects of the method for wireless communication described above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
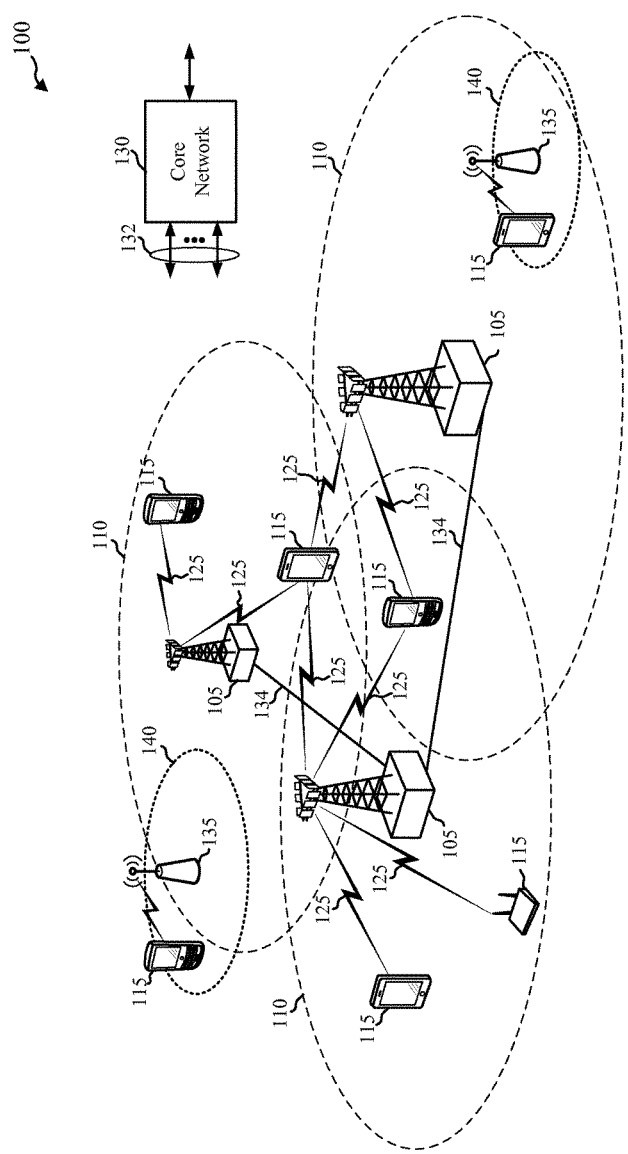
FIG. 1 shows a block diagram of a wireless communication system, in accordance with various aspects of the present disclosure.

Techniques are described in which communications over an unlicensed radio frequency spectrum band are coordinated. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band). In some examples, the unlicensed radio frequency spectrum band may be used for cellular communications (e.g., Long Term Evolution (LTE) communications or LTE-Advanced (LTE-A) communications).

A contention access protocol such as an LBT-LBE protocol may be used to mitigate the effects of unfair shared access to a wireless communication medium (e.g., starvation of access to an unlicensed radio frequency spectrum band). However, in contrast to an LBT-FBE protocol in which a transmitter performs one CCA procedure per radio frame, with access to a medium being achieved or not achieved based on the outcome of the one CCA procedure, an LBT-LBE protocol involves the performance of an extended CCA procedure. The extended CCA procedure, in turn, involves the performance of a random number of N CCA procedures. The random number, N, is determined on a transmitter-by-transmitter basis. In the context of a single operator (e.g., a single mobile network operator (MNO) or public land mobile network (PLMN)), the different random numbers generated by the different transmitters associated with the operator may result in transmitters of the same operator competing with one another for access to a medium and, in some cases, one or more transmitters of the operator may prevent one or more other apparatuses of the operator from gaining access to the unlicensed radio frequency spectrum band. Such a scenario may be undesirable.

The techniques described herein may enable a first transmitter (e.g., an evolved Node B (eNB) or a base station) to identify a first contention access protocol timing (e.g., a first LBT-LBE protocol timing) and align a second contention access protocol timing (e.g., an LBT-LBE protocol timing) to the first contention access protocol timing. The second contention access protocol timing may be used by the first transmitter to access an unlicensed radio frequency spectrum band. When other transmitters also align their contention access protocol timings with the first contention access protocol timing, some or all of the transmitters having their contention access protocol timings so aligned may access the unlicensed radio frequency band in a coordinated manner, without preventing another of the transmitters from accessing the unlicensed radio frequency spectrum band. In some examples, the first contention access protocol timing may be a reference contention access protocol timing (e.g., a contention access protocol timing where every extended CCA procedure was successful) or a contention access protocol timing of a designated transmitter among a plurality of transmitters associated with a single operator.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a plurality of Wi-Fi access points 135, a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. The Wi-Fi access points 135 may communicate with the UEs 115 via one or more Wi-Fi antennas. Each of the base stations 105 and Wi-Fi access points 135 may provide communication coverage for a respective coverage area 110 or 140. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, or some other suitable terminology. The coverage area 110 for a base station 105 may be divided into sectors making up only a portion of the coverage area. The wireless communication system 100 may include base stations 105 of different types (e.g., macro, micro, or pico base stations). The base stations 105 may also utilize different radio technologies, such as wireless wide area network (WWAN) or wireless local area network (WLAN) radio access technologies (e.g., cellular or Wi-Fi radio access technologies). The base stations 105 may be associated with the same or different access networks or operator deployments. The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network), which may support one or more modes of operation or deployment in a licensed radio frequency spectrum band (e.g., a radio frequency spectrum band for which apparatuses do not contend for access because the spectrum band is licensed to certain users for certain uses) or an unlicensed radio frequency spectrum band (e.g., a radio frequency spectrum band for which apparatuses may contend for access because the radio frequency spectrum band is available, at least in part, for unlicensed use). For instance, an apparatus may contend for Wi-Fi use or LTE/LTE-A use in an unlicensed radio frequency spectrum band. In other examples, the wireless communication system 100 may support wireless communication using one or more access technologies different from LTE/LTE-A. In LTE/LTE-A communication systems, the term evolved NodeB or eNB may be used, for example, to describe one or more (e.g., a group) of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another (e.g., directly or indirectly) via backhaul links 134 (e.g., X2 application protocol, etc.) or via backhaul 132 (e.g., through core network 130). The wireless communication system 100 may support synchronous or asynchronous operation. For synchronous operation, the eNBs may have similar radio frame or gating timing, and transmissions from different eNBs may be approximately aligned in time. For asynchronous operation, the eNBs may have different radio frame or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN (e.g., Wi-Fi) access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a certain mode of communication may be received (e.g., at a UE 115) over a licensed radio frequency spectrum band, over an unlicensed radio frequency spectrum band, or over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications or uplink communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, or a standalone mode in which LTE/LTE-A downlink and uplink communications between a base station 105 and a UE 115 may take place in an unlicensed radio frequency spectrum band. Base stations 105 as well as UEs 115 may in some examples support one or more of these or similar modes of operation. OFDMA waveforms may be used in the communication links 125 for LTE/LTE-A downlink communications in a licensed radio frequency spectrum band or an unlicensed radio frequency spectrum band, while OFDMA, SC-FDMA or resource block interleaved FDMA waveforms may be used in the communication links 125 for LTE/LTE-A uplink communications in a licensed radio frequency spectrum band or an unlicensed radio frequency spectrum band.

In some examples, one or more of the base stations 105 may contend for access to an unlicensed radio frequency spectrum band using an LBT-LBE protocol. Because the LBT-LBE protocol is based on an extended CCA procedure (which is based on performing a CCA procedure a random number of N times), there may be times when one or more of the base stations 105 prevent one or more other base stations 105 from accessing the unlicensed radio frequency spectrum band. This may be undesirable, for example, when one or more base stations associated with an operator successfully contend for access to the unlicensed radio frequency spectrum band and prevent one or more other base stations associated with the same operator from accessing the unlicensed radio frequency spectrum band.

Figure 2:
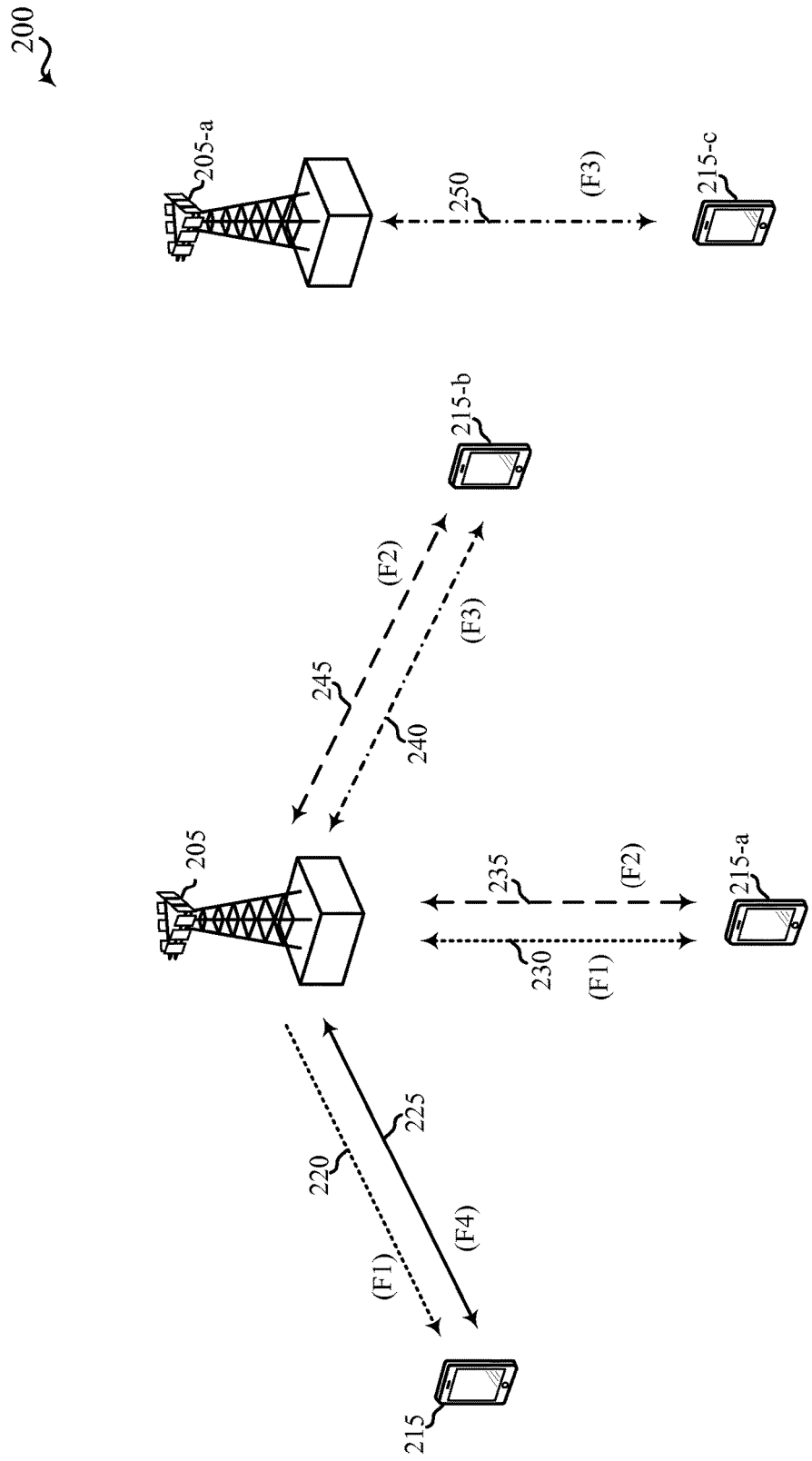
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure.

More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). A supplemental downlink scenario may occur with any service provider (e.g., a mobile network operator (MNO)) that uses a licensed radio frequency spectrum and wishes to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the unlicensed radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and wishes to relieve some of the traffic or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, or resource block interleaved waveforms from the third UE 215-*b* using the fourth bidirectional link 240. The fourth bidirectional link 240 may be associated with a frequency F3 in the unlicensed radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a boot-strapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, or resource block interleaved FDMA waveforms from the fourth UE 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 205-*a* described with reference to FIG. 1 or 2, or one of the UEs 115, 215, 215-*a*, 215-*b*, or 215-*c* described with reference to FIG. 1 or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus is to perform a contention procedure, such as a CCA procedure. In some examples (e.g., LBT-LBE examples), the CCA procedure may include an extended CCA procedure. The outcome of the CCA procedure may indicate to the transmitting apparatus whether a channel of an unlicensed radio frequency spectrum band is available or in use during the gating interval (also referred to as an LBT radio frame or a CCA radio frame). When a CCA procedure indicates that the channel is available (e.g., "clear" for use) during a corresponding LBT radio frame, the transmitting apparatus may reserve or use the channel of the unlicensed radio frequency spectrum band during part or all of the LBT radio frame. When the CCA procedure indicates that the channel is not available (e.g., that the channel is in use or reserved by another apparatus), the transmitting apparatus may be prevented from using the channel during the LBT radio frame.

In some examples of an LBT-LBE protocol, a transmitting apparatus may perform a CCA procedure and, when the CCA procedure is successful, immediately begin transmitting over a channel of an unlicensed radio frequency spectrum band. However, when the CCA procedure is unsuccessful, the transmitting apparatus may perform an extended CCA procedure by selecting a random integer, N, between 1 and q, where q has a value of $4 \leq q \leq 32$ advertised by an operator or vendor. Upon selecting a value for the random integer, N, the transmitting apparatus may wait to access an unlicensed radio frequency spectrum band for N CCA procedures where a channel of the unlicensed radio frequency spectrum band is found to be clear. Upon the channel of the unlicensed radio frequency spectrum band being found clear for the N CCA procedures, the transmitting apparatus may transmit over the unlicensed radio frequency spectrum band for at most $(13/32) \times q$ milliseconds (msec) before performing another extended CCA procedure. The $(13/32) \times q$ msec transmission time is therefore a maximum channel occupancy time (i.e., MaxChannelOccupancyTime). Upon receiving a transmission from the transmitter, a receiver may immediately begin an acknowledgement/non-acknowledgement (ACK/NAK) transmission, provided the last successful CCA procedure or extended CCA procedure was performed less than MaxChannelOccupancyTime ago. A radio frame that occurs after an extended CCA procedure may have a starting point subject to the outcome of the extended CCA procedure, and may be referred to as a virtual radio frame.

One advantage of an LBT-LBE protocol over an LBT-FBE protocol is that a transmitter (or transmitting apparatus) persistently attempts to access a medium. The transmitter attempts to access the medium for a random duration of N CCA procedures, but for a maximum duration controlled by the parameter q. A smaller value of q implies a shorter maximum extended CCA procedure duration and shorter radio frame length. One disadvantage of an LBT-LBE protocol compared to an LTB-FBE protocol is that the random integer, N, on which an extended CCA procedure is based provides for asynchronous operation of a plurality of transmitters, potentially leading to inefficient operation (e.g., dimension loss).

Figure 3:
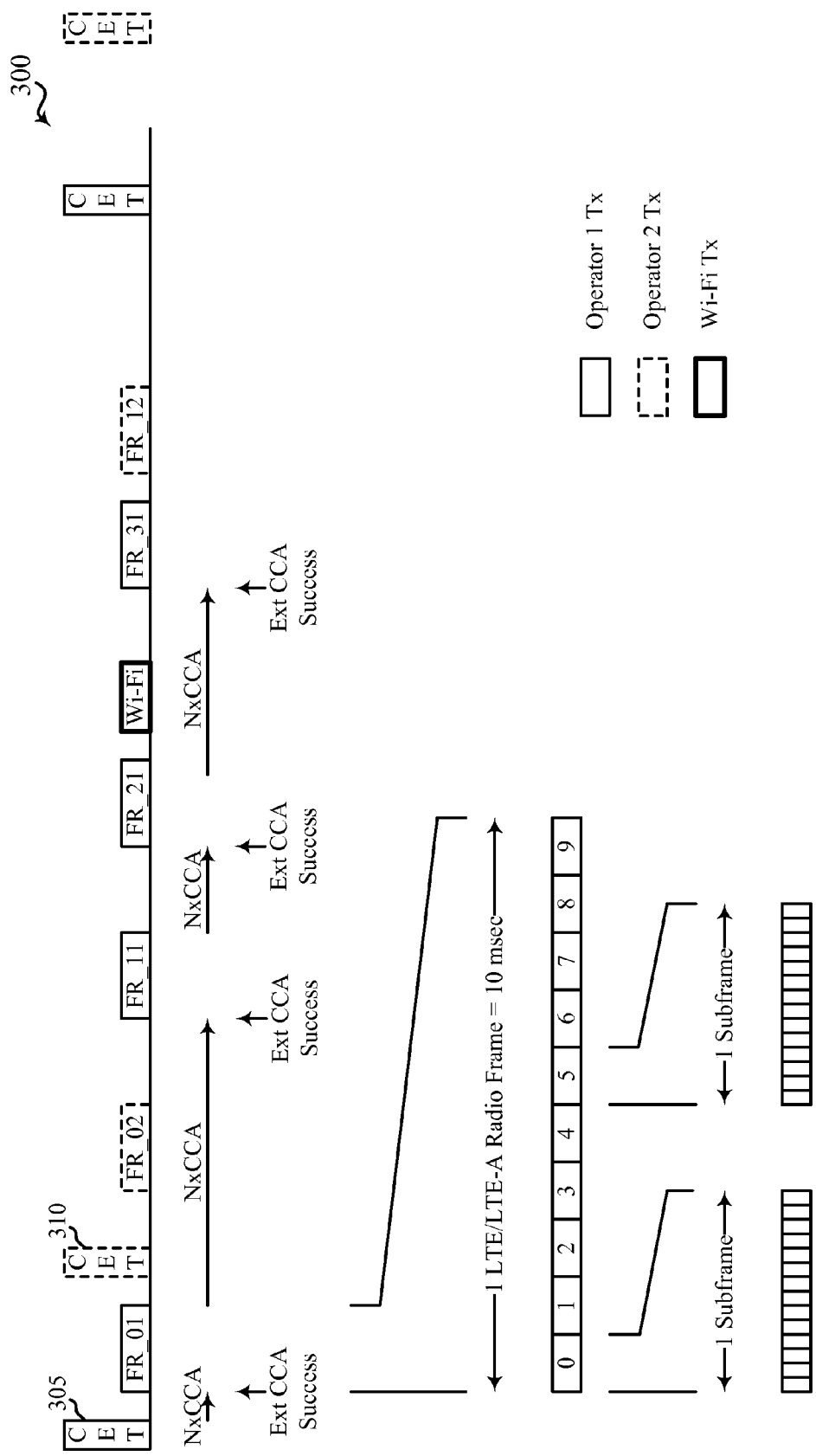
FIG. 3 shows a timing diagram of wireless communications over an unlicensed radio frequency spectrum band, in accordance with various aspects of the present disclosure.

FIG. 3 shows a timing diagram 300 of wireless communications over an unlicensed radio frequency spectrum band, in accordance with various aspects of the present disclosure. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 3 include communications (or transmissions (Tx)) by an Operator 1, an Operator 2, and a Wi-Fi node. By way of further example, transmitters of Operator 1 and Operator 2, as well as the Wi-Fi node, may be within CCA range of each other. Operator 1 may transmit a CCA-Exempt Transmission (CET) 305 over the unlicensed radio frequency spectrum band, followed by a first number of radio frames (e.g., radio frames FR_01, FR_11, FR_21, or FR_31). Operator 2 may transmit a CET 310 over the unlicensed radio frequency spectrum band, followed by a second number of radio frames (e.g., radio frames FR_02 or FR_12). The Wi-Fi node may also transmit over the unlicensed radio frequency spectrum band (e.g., the transmission labeled Wi-Fi). When a transmitter associated with Operator 1 is transmitting over a channel of the unlicensed radio frequency spectrum band, Operator 2 and the Wi-Fi node may be prevented from accessing the channel of the unlicensed radio frequency spectrum band. When a transmitter associated with Operator 2 is transmitting over a channel of the unlicensed radio frequency spectrum band, transmitters of Operator 1 and the Wi-Fi node may be prevented from accessing the channel of the unlicensed radio frequency spectrum band. When the Wi-Fi node is transmitting over a channel of the unlicensed radio frequency spectrum band, transmitters associated with Operator 1 and Operator 2 may be prevented from accessing the channel of the unlicensed radio frequency spectrum band.

In some examples, the transmitters of Operator 1 and Operator 2 may gain access to the unlicensed radio frequency spectrum band (or a channel thereof) by performing an extended CCA procedure labeled NxCCA. Access is gained when an extended CCA procedure is successful (labeled as Ext CCA Success).

In some examples, each radio frame transmitted by Operator 1 or Operator 2 may be an LTE/LTE-A radio frame having 10 subframes and a duration of 10 msec. Each subframe may include, for example, fourteen OFDM symbols. The subframes may variously include data subframes, uplink subframes, or special subframes (e.g., subframes used to transmit control information, synchronization signals, some data, etc.). In some examples, the first few OFDM symbols of a first subframe of a radio frame may be used to transmit synchronization signals (e.g., a primary synchronization signal (PSS), a secondary synchronization signal (SSS), a dedicated reference signal (DRS), or a channel usage beacon signal (CUBS)).

FIGS. 4-8 illustrate various examples in which a first transmitter (e.g., an LTE/LTE-A eNB or LTE/LTE-A base station) identifies a first contention access protocol timing for accessing an unlicensed radio frequency spectrum band and a second contention access protocol timing aligning to the first contention access protocol timing. The second contention access protocol timing may be used by the first transmitter for accessing the unlicensed radio frequency spectrum band. When contending for access to or transmitting over the unlicensed radio frequency spectrum band, the alignment of the second contention access protocol timing with the first contention access protocol timing may mitigate the first transmitter's blocking of (and being blocked by) other transmitters that have aligned their contention access protocol timings with the first contention access protocol timing.

Figure 4:
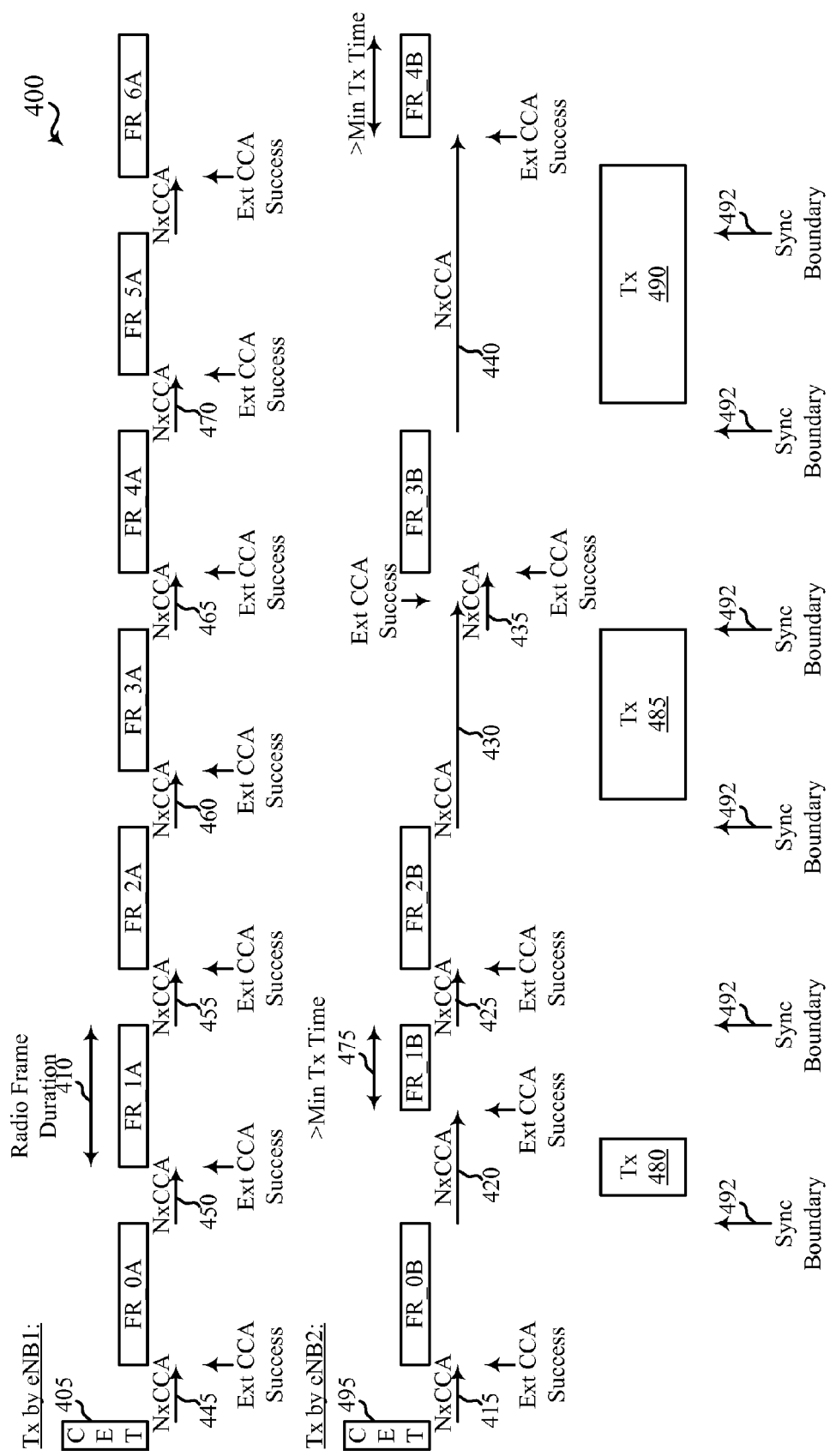
FIG. 4 shows a timing diagram of wireless communications over an unlicensed radio frequency spectrum band, in accordance with various aspects of the present disclosure.

FIG. 4 shows a timing diagram 400 of wireless communications over an unlicensed radio frequency spectrum band, in accordance with various aspects of the present disclosure. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 4 include communications (or transmissions (Tx)) by an eNB1 and eNB2. The eNB1 and the eNB2 may be associated with a same operator. The eNB1 may access and transmit over the unlicensed radio frequency spectrum band in accordance with a first contention access protocol timing (e.g., a first LBT-LBE timing). The first contention access protocol timing is based at least in part on a continuum of successful extended CCA procedures and a fixed number of N CCA procedures per extended CCA procedure. In some examples, the first contention access protocol timing may be used to transmit virtual radio frames (e.g., virtual radio frames FR_0A, FR_1A, FR_2A, FR_3A, FR_4A, FR_5A, or FR_6A) over the unlicensed radio frequency spectrum band. In other examples, the first contention access protocol timing may be a reference contention access protocol timing or the eNB1 may be an imaginary "reference" eNB. In some examples, the virtual radio frame transmissions by the eNB1 may by synchronized (or aligned) to a CET 405 of the eNB1. Each of the virtual radio frames transmitted by the eNB1 (e.g., virtual radio frames FR_0A, FR_1A, FR_2A, FR_3A, FR_4A, FR_5A, or FR_6A) may have a common radio frame duration 410.

In some examples, the second contention access protocol timing may be used to transmit virtual radio frames (e.g., virtual radio frames FR_0B, FR_1B, FR_2B, FR_3B, or FR_4B) over the unlicensed radio frequency spectrum band. In some examples, the virtual radio frame transmissions by the eNB2 may by synchronized (or aligned) to a CET 495 of the eNB2.

In some examples, one or more extended CCA procedures (e.g., extended CCA procedure 420, 430, or 440) performed by the eNB2 for accessing the unlicensed radio frequency spectrum band may take longer to complete because of transmissions (e.g., Tx 480, 485, or 490) made over the unlicensed radio frequency spectrum band by other nodes (e.g., transmissions by Wi-Fi nodes or eNBs of other operators). If the eNB1 and the eNB2 generate different random integers, N1 and N2, for performing extended CCA procedures, the transmissions 480, 485, or 490 may cause the eNB1 and the eNB2 to lose synchronization and operate asynchronously.

In some examples, the eNB2 may identify the first contention access protocol timing and align its contention access protocol timing (e.g., a second contention access protocol timing, for example, a second LBT-LBE timing) with the first contention access protocol timing. The second contention access protocol timing may be used by the eNB2 for accessing the unlicensed radio frequency spectrum band. In some examples, and as demonstrated by virtual radio frame FR_1B, the aligning may include adjusting a timing of a virtual radio frame transmission by the eNB2 based at least in part on the first contention access protocol timing. The adjusting may include, for example, adjusting a duration of at least one virtual radio frame (e.g., the virtual radio frame duration 475 of the virtual radio frame FR_1B) to coincide with a virtual radio frame duration 410 so that the second contention access protocol timing of the eNB2 may be aligned with the first contention access protocol timing. For example, the virtual radio frame ending of the virtual radio frame FR_1B may be adjusted to coincide with a radio frame ending of the radio frame FR_1A, or the virtual radio frame duration 475 of the radio frame FR_1B may be shortened with respect to the virtual radio frame duration 410.

In some examples, and as demonstrated by each of the extended CCA procedures 415, 420, 425, 430, 435, and 440, the alignment may include aligning a second timing of a second extended CCA procedure (e.g., the extended CCA procedure 415, 420, 425, 430, 435, or 440) with a first timing of a first extended CCA procedure (e.g., the extended CCA procedure 445, 450, 455, 460, 465, or 470). In some examples, the aligning may be performed with respect to a synchronization boundary 492 occurring once every M radio frames in the first contention access protocol timing. By way of example, M equals one in FIG. 4. In alternate examples, M may be an integer greater than one. In some examples, the alignment may include aligning a commencement of a first extended CCA procedure with a commencement of a second extended CCA procedure. In some examples, the alignment may include syncing a first random number generator on which a first extended CCA procedure is based with a second random number generator on which the second extended CCA procedure is based (denoted, for example, by the common random integer, N, used by the first extended CCA procedures 415, 420, 425, 430, 435, and 440 and the second extended CCA procedures 445, 450, 455, 460, 465, and 470).

In some examples, the eNB2 may perform a first extended CCA procedure (e.g., the first extended CCA procedure 430), and when the first extended CCA procedure 430 is successful, the eNB2 may determine whether transmission of a virtual radio frame over the unlicensed radio frequency band will interfere with at least a second transmitter (e.g., the eNB1 or another eNB) performing the second extended CCA procedure 465 or a third extended CCA procedure (e.g., an extended CCA procedure performed by an eNB other than the eNB1). As part of the determination, a first random number generator used to perform the first extended CCA procedure 435 may be synced with a second random number generator used to perform the second extended CCA procedure 465. When it is determined that transmission of the virtual radio frame by the eNB2 would interfere with the second transmitter performing the second extended CCA procedure 465 or a third extended CCA procedure, virtual radio frame transmission may be skipped until a subsequent successful CCA procedure (e.g., until the successful extended CCA procedure 435 and the transmitted virtual radio frame FR_3B).

In some examples, a virtual radio frame transmission may be skipped when an extended CCA procedure is not successful because of a transmission made by a neighboring node associated with a same operator as the first node (e.g., a neighboring LTE/LTE-A eNB or a neighboring LTE/LTE-A base station that is associated with a same operator as the first node). In these examples, the first node may wait to transmit until an extended CCA procedure at the neighboring node expires (e.g., the first node may wait to transmit until after the neighboring node has completed its transmission, and in alignment with the extended CCA procedure of the neighboring node). This may provide for better synchronization of the nodes of an operator. In some examples, the first node may perform a CCA procedure before transmission. For example, when there is a gap between the time when the first node successfully contends for the unlicensed radio frequency spectrum band via its extended CCA procedure and the time when the neighboring node successfully contends for the unlicensed radio frequency spectrum band via its extended CCA procedure.

Figure 5:
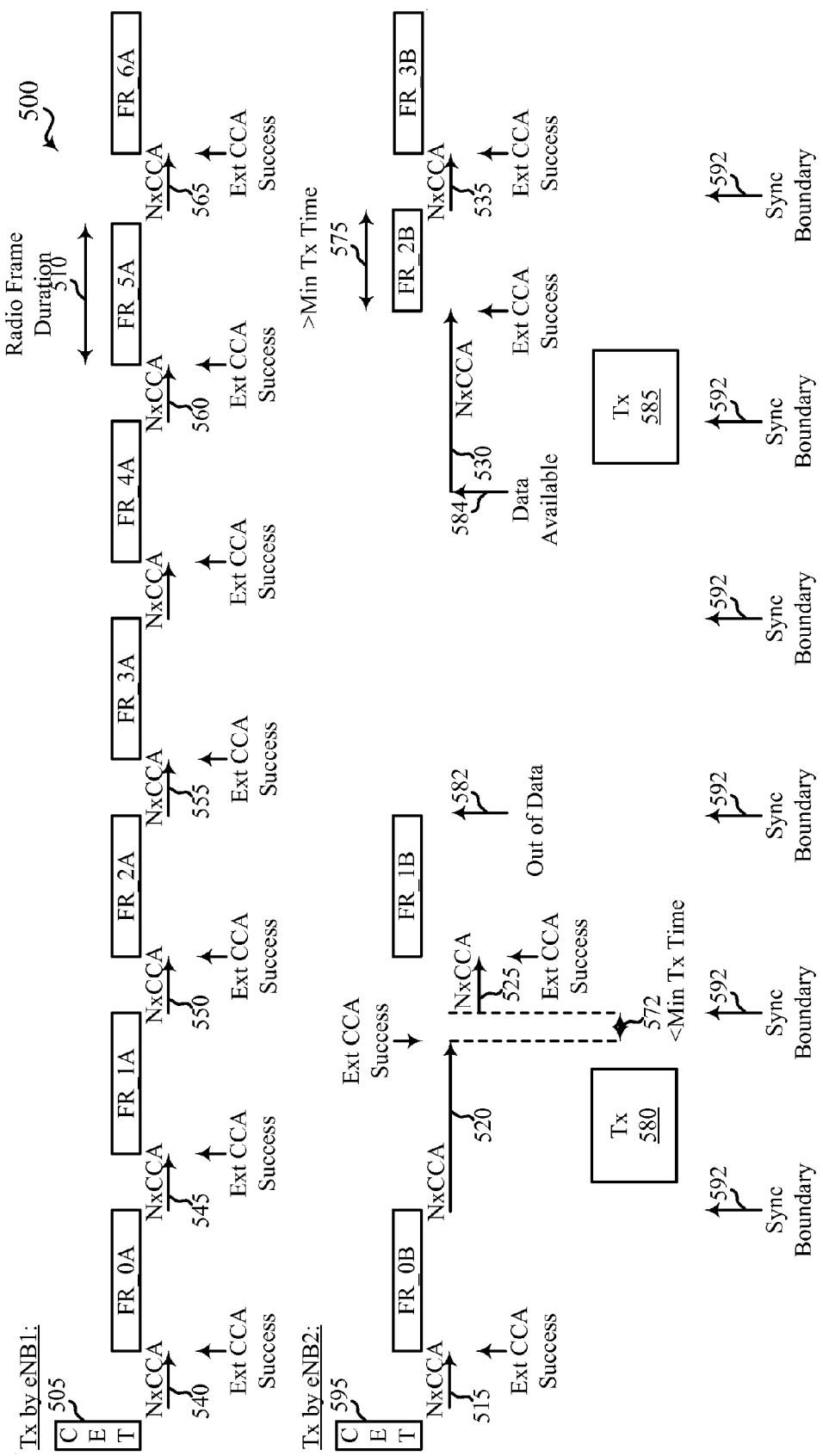
FIG. 5 shows a timing diagram of wireless communications over an unlicensed radio frequency spectrum band, in accordance with various aspects of the present disclosure.

FIG. 5 shows a timing diagram 500 of wireless communications over an unlicensed radio frequency spectrum band, in accordance with various aspects of the present disclosure.

In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 5 include communications (or transmissions (Tx)) by an eNB1 and eNB2. The eNB1 and the eNB2 may be associated with a same operator. The eNB1 may access and transmit over the unlicensed radio frequency spectrum band in accordance with a first contention access protocol timing (e.g., a first LBT-LBE timing). The first contention access protocol timing is based at least in part on a continuum of successful extended CCA procedures and a fixed number of N CCA procedures per extended CCA procedure. In some examples, the first contention access protocol timing may be used to transmit virtual radio frames (e.g., virtual radio frames FR_0A, FR_1A, FR_2A, FR_3A, FR_4A, FR_5A, or FR_6A) over the unlicensed radio frequency spectrum band. In other examples, the first contention access protocol timing may be a reference contention access protocol timing or the eNB1 may be an imaginary "reference" eNB. In some examples, the virtual radio frame transmissions by the eNB1 may by synchronized (or aligned) to a CET 505 of the eNB1. Each of the virtual radio frames (e.g., virtual radio frames FR_0A, FR_A, FR_2A, FR_3A, FR_4A, FR_5A, or FR_6A) may have a common radio frame duration 510.

In some examples, the second contention access protocol timing may be used to transmit virtual radio frames (e.g., virtual radio frames FR_0B, FR_1B, FR_2B, or FR_3B) over the unlicensed radio frequency spectrum band. In some examples, the virtual radio frame transmissions by the eNB2 may by synchronized (or aligned) to a CET 595 of the eNB2.

In some examples, one or more extended CCA procedures (e.g., extended CCA procedures 520 or 530) performed by the eNB2 for accessing the unlicensed radio frequency spectrum band may take longer to complete because of transmissions (e.g., Tx 580 or 585) made over the unlicensed radio frequency spectrum band by other nodes (e.g., transmissions by Wi-Fi nodes or eNBs of other operators). If the eNB1 and the eNB2 generate different random integers, N1 and N2, for performing extended CCA procedures, the transmissions 580 or 585 may cause the eNB1 and the eNB2 to lose synchronization and operate asynchronously.

In some examples, the eNB2 may identify the first contention access protocol timing and align its contention access protocol timing (e.g., a second contention access protocol timing, for example, a second LBT-LBE timing) with the first contention access protocol timing. The second contention access protocol timing may be used by the eNB2 for accessing the unlicensed radio frequency spectrum band. In some examples, and as demonstrated by virtual radio frame FR_2B, the aligning may include adjusting a timing of a virtual radio frame transmission by the eNB2 based at least in part on the first contention access protocol timing. The adjusting may include, for example, adjusting a duration of at least one virtual radio frame (e.g., the radio frame duration 575 of the virtual radio frame FR_2B) to coincide with a radio frame duration 510 indicated by the first contention access protocol timing. For example, the radio frame ending of the virtual radio frame FR_2B may be adjusted to coincide with a radio frame ending of the virtual radio frame FR_5A, or the radio frame duration 575 of the virtual radio frame FR_2B may be shortened with respect to the radio frame duration 510.

In some examples, and as demonstrated by each of the extended CCA procedures 515, 520, 525, and 535, the aligning may include aligning a first timing of a first extended CCA procedure (e.g., the extended CCA procedure 515, 520, 525, or 535) with a second timing of a second extended CCA procedure (e.g., the extended CCA procedure 540, 545, 550, or 565) indicated by the first contention access protocol timing. In some examples, the aligning may be performed with respect to a synchronization boundary 592 occurring once every M radio frames in the first contention access protocol timing. By way of example, M equals one in FIG. 5. In alternate examples, M may be an integer greater than one. In some examples, the aligning may include an aligning of a commencement of a first extended CCA procedure with a commencement of a second extended CCA procedure. In some examples, the aligning may include syncing a first random number generator on which a first extended CCA procedure is based with a second random number generator on which the second extended CCA procedure is based (denoted, for example, by the common random integer, N, used by the first extended CCA procedures 515, 520, 525, 530, and 535 and the second extended CCA procedures 540, 545, 550, 555, 560, and 565).

In some examples, the eNB2 may perform a first extended CCA procedure (e.g., the first extended CCA procedure 520), and when the first extended CCA procedure 520 is successful, the eNB2 may determine whether transmission of a virtual radio frame over the unlicensed radio frequency band will interfere with at least a second transmitter (e.g., the eNB1 or another eNB) performing the second extended CCA procedure 550 or a third extended CCA procedure (e.g., an extended CCA procedure performed by an eNB other than the eNB1). As part of the determination, a first random number generator used to perform the first extended CCA procedure 525 may be synced with a second random number generator used to perform the second extended CCA procedure 550. When it is determined that transmission of the virtual radio frame by the eNB2 would interfere with the second transmitter performing the second extended CCA procedure 550 (e.g., because the time 572 to transmit the virtual radio frame, considering the timing of the extended CCA procedure 550, is less than a minimum transmission time) or a third extended CCA procedure, virtual radio frame transmission may be skipped until a subsequent successful CCA procedure (e.g., until the successful extended CCA procedure 525 and the transmitted virtual radio frame FR_1B).

Also shown in FIG. 5 is a scenario in which the eNB2 temporarily runs out of data at a time 582 but has new data available to transmit at a time 584. During a period of no data availability, the eNB2 may not transmit over the unlicensed radio frequency spectrum band. In some examples, the eNB2 may perform an extended CCA procedure 530 immediately upon acquiring data, at time 582, versus aligning the extended CCA procedure 530 with the extended CCA procedure 560.

Figure 6:
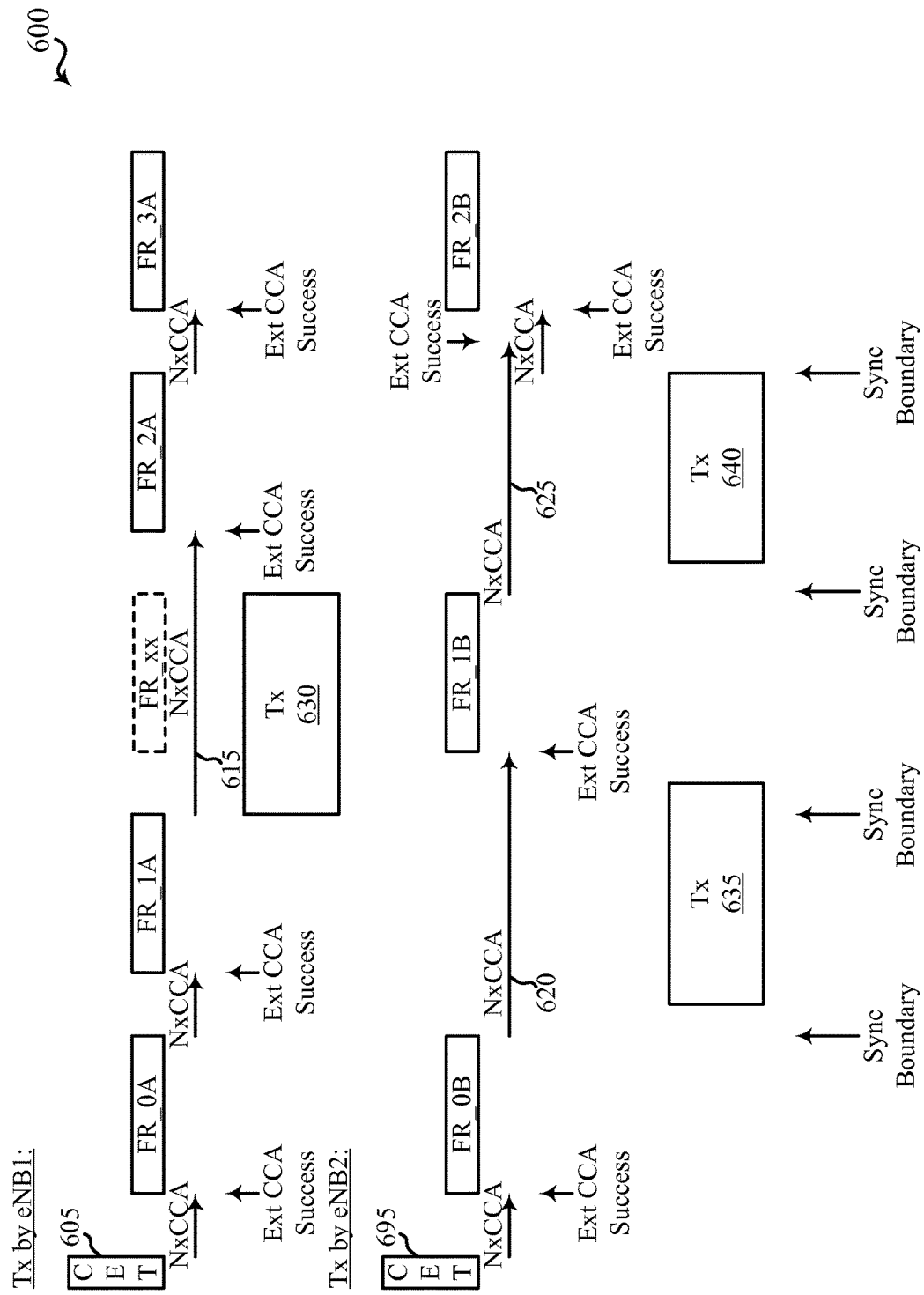
FIG. 6 shows a timing diagram of wireless communications over an unlicensed radio frequency spectrum band, in accordance with various aspects of the present disclosure.

FIG. 6 shows a timing diagram 600 of wireless communications over an unlicensed radio frequency spectrum band, in accordance with various aspects of the present disclosure. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 6 include communications (or transmissions (Tx))

by an eNB1 and eNB2. The eNB1 and the eNB2 may be associated with a same operator. The eNB1 may access and transmit over the unlicensed radio frequency spectrum band in accordance with a first contention access protocol timing (e.g., a first LBT-LBE timing). The first contention access protocol timing is based at least in part on a continuum of successful extended CCA procedures and a fixed number of N CCA procedures per extended CCA procedure. In some examples, the first contention access protocol timing may be used to transmit virtual radio frames (e.g., virtual radio frames FR_0A, FR_1A, FR_2A, or FR_3A) over the unlicensed radio frequency spectrum band. In some examples, the virtual radio frame transmissions by the eNB1 may by synchronized (or aligned) to a CET 605 of the eNB1. Each of the virtual radio frames (e.g., virtual radio frames FR_0A, FR_1A, FR_2A, or FR_3A) may have a common radio frame duration.

In some examples, the second contention access protocol timing may be used to transmit virtual radio frames (e.g., virtual radio frames FR_0B, FR_1B, or FR_2B) over the unlicensed radio frequency spectrum band. In some examples, the virtual radio frame transmissions by the eNB2 may by synchronized (or aligned) to a CET 695 of the eNB2.

In some examples, one or more extended CCA procedures (e.g., extended CCA procedures 615, 620, or 625) performed by the eNB1 or the eNB2 may take longer to complete because of transmissions (e.g., Tx 630, 635, or 640) made over the unlicensed radio frequency spectrum band by other nodes (e.g., transmissions by Wi-Fi nodes or eNBs of other operators). If the eNB1 and the eNB2 generate different random integers, N1 and N2, for performing extended CCA procedures, the transmissions 630, 635, or 640 may cause the eNB1 and the eNB2 to lose synchronization and operate asynchronously.

In some examples, the eNB2 may identify the first contention access protocol timing and align its contention access protocol timing (e.g., a second contention access protocol timing, for example, a second LBT-LBE timing) with the first contention access protocol timing. The second contention access protocol timing may be used by the eNB2 for accessing the unlicensed radio frequency spectrum band. In some examples, and as demonstrated by each of the extended CCA procedures 620 and 625, the aligning may include skipping a virtual radio frame transmission until a subsequent successful CCA procedure. In some examples, the eNB1 may also skip a virtual radio frame transmission, as indicated by the extended CCA procedure 615 and the phantom (not transmitted) virtual radio frame FR_xx.

Figure 7:
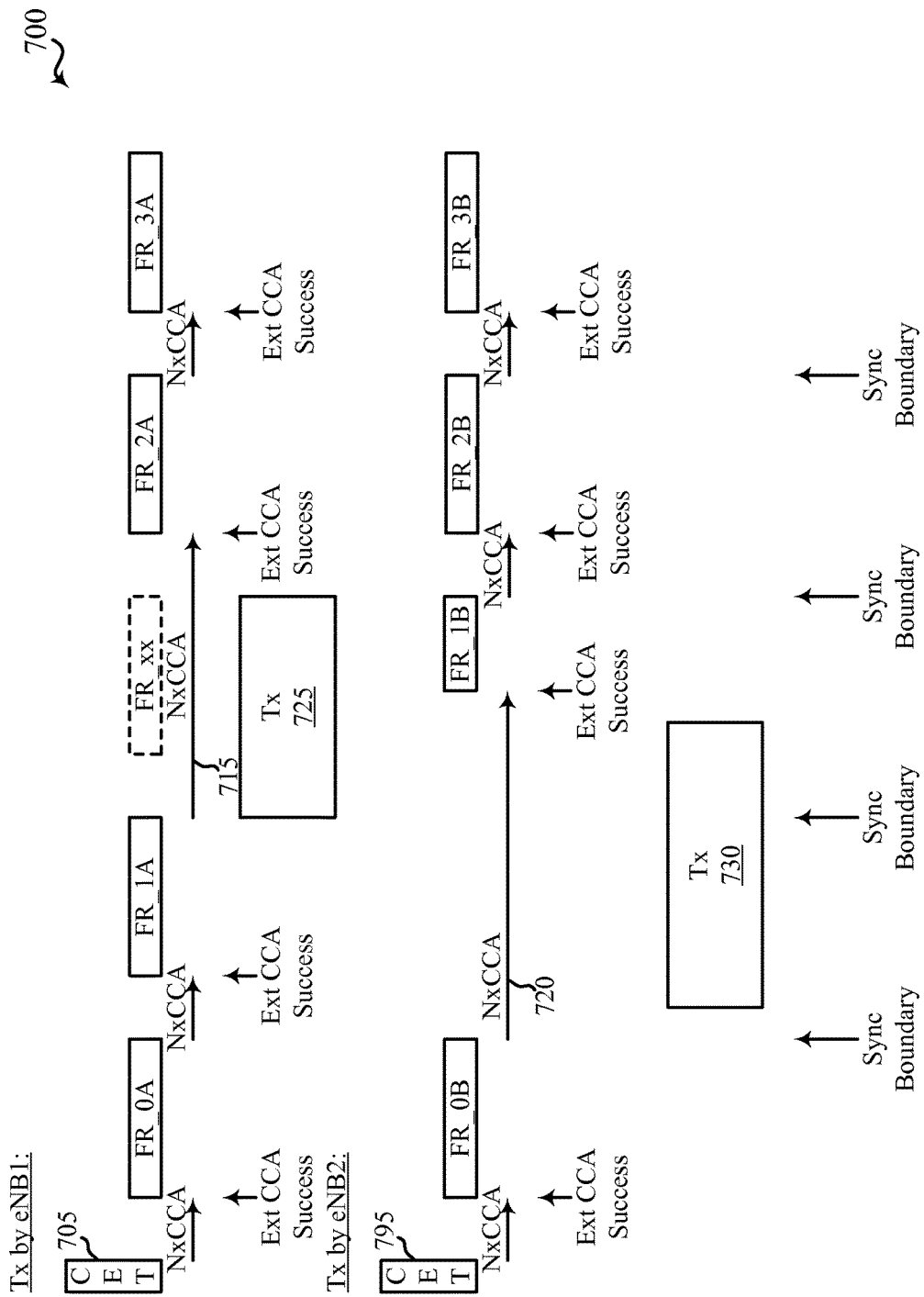
FIG. 7 shows a timing diagram of wireless communications over an unlicensed radio frequency spectrum band, in accordance with various aspects of the present disclosure.

FIG. 7 shows a timing diagram 700 of wireless communications over an unlicensed radio frequency spectrum band, in accordance with various aspects of the present disclosure. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 7 include communications (or transmissions (Tx)) by an eNB1 and eNB2. The eNB1 and the eNB2 may be associated with a same operator. The eNB1 may access and transmit over the unlicensed radio frequency spectrum band in accordance with a first contention access protocol timing (e.g., a first LBT-LBE timing). The first contention access protocol timing is based at least in part on a continuum of successful extended CCA procedures and a fixed number of N CCA procedures per extended CCA procedure. In some examples, the first contention access protocol timing may be used to transmit virtual radio frames (e.g., virtual radio frames FR_0A, FR_1A, FR_2A, or FR_3A) over the unlicensed radio frequency spectrum band. In some examples, the virtual radio frame transmissions by the eNB1 may by synchronized (or aligned) to a CET 705 of the eNB1. Each of the virtual radio frames (e.g., virtual radio frames FR_0A, FR_1A, FR_2A, or FR_3A) may have a common radio frame duration.

In some examples, the second contention access protocol timing may be used to transmit virtual radio frames (e.g., virtual radio frames FR_0B, FR_1B, or FR_2B) over the unlicensed radio frequency spectrum band. In some examples, the virtual radio frame transmissions by the eNB2 may by synchronized (or aligned) to a CET 795 of the eNB2.

In some examples, one or more extended CCA procedures (e.g., extended CCA procedures 715 or 720) performed by the eNB1 or the eNB2 may take longer to complete because of transmissions (e.g., Tx 725 or 730) made over the unlicensed radio frequency spectrum band by other nodes (e.g., transmissions by Wi-Fi nodes or eNBs of other operators). If the eNB1 and the eNB2 generate different random integers, N1 and N2, for performing extended CCA procedures, the transmissions 725 or 730 may cause the eNB1 and the eNB2 to lose synchronization and operate asynchronously.

In some examples, the eNB2 may identify the first contention access protocol timing and align its contention access protocol timing (e.g., a second contention access protocol timing, for example, a second LBT-LBE timing) with the first contention access protocol timing. The second contention access protocol timing may be used by the eNB2 for accessing the unlicensed radio frequency spectrum band. In some examples, and as demonstrated by virtual radio frame FR_1B, the aligning may include adjusting a timing of a virtual radio frame transmission by the eNB2 based at least in part on the first contention access protocol timing. The adjusting may include, for example, adjusting a duration of at least one virtual radio frame (e.g., the radio frame duration of the virtual radio frame FR_1B) to coincide with a radio frame duration indicated by the first contention access protocol timing (e.g., the radio frame duration of the virtual radio frame FR_xx). For example, the radio frame ending of the virtual radio frame FR_1B may be adjusted to coincide with a radio frame ending of the virtual radio frame FR_xx, or the radio frame duration of the virtual radio frame FR_1B may be shortened with respect to the radio frame duration of the virtual radio frame FR_xx in order to align the second contention access protocol timing with the first contention access protocol timing. In some examples, the virtual radio frame FR_xx may be a phantom radio frame that is not transmitted, but used for purposes of establishing the first contention access protocol timing.

Figure 8:
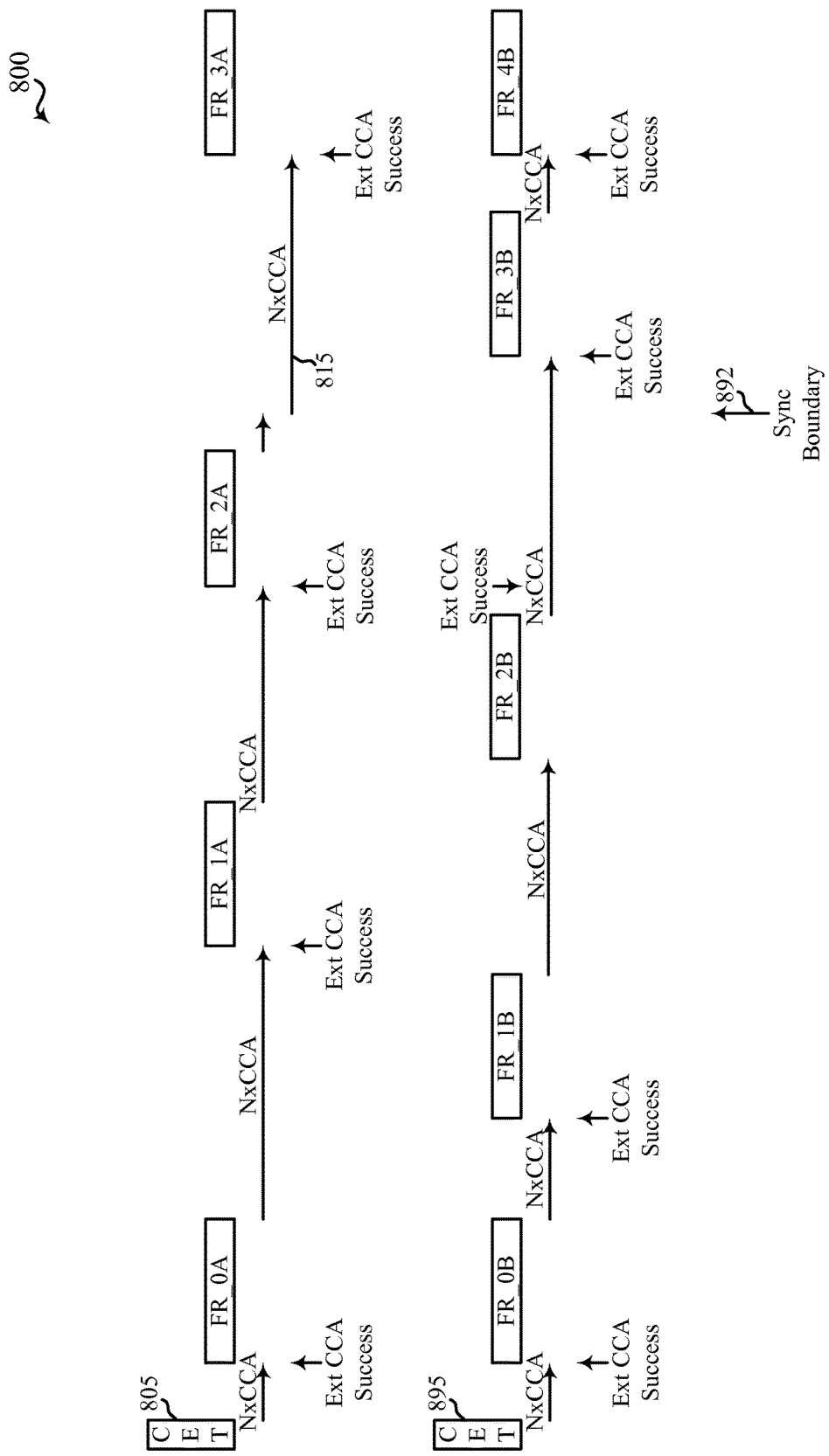
FIG. 8 shows a timing diagram of wireless communications over an unlicensed radio frequency spectrum band, in accordance with various aspects of the present disclosure.

FIG. 8 shows a timing diagram 800 of wireless communications over an unlicensed radio frequency spectrum band, in accordance with various aspects of the present disclosure. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 8 include communications (or transmissions (Tx)) by an eNB1 and eNB2. The eNB1 and the eNB2 may be associated with a same operator. The eNB1 may access and transmit over the unlicensed radio frequency spectrum band in accordance with a first contention access protocol timing (e.g., a first LBT-LBE timing). The first contention access protocol timing is based at least in part on a continuum of successful extended CCA procedures and a fixed number of N CCA procedures per extended CCA procedure. In some examples, the first contention access protocol timing may be used to transmit virtual radio frames (e.g., virtual radio frames FR_0A, FR_1A, FR_2A, or FR_3A) over the unlicensed radio frequency spectrum band. In other examples, the first contention access protocol timing may be a reference contention access protocol timing or the eNB1 may be an imaginary "reference" eNB. In some examples, the virtual radio frame transmissions by the eNB1 may by synchronized (or aligned) to a CET 805 of the eNB1. Each of the virtual radio frames (e.g., virtual radio frames FR_0A, FR_1A, FR_2A, or FR_3A) may have a common radio frame duration.

In some examples, the second contention access protocol timing may be used to transmit virtual radio frames (e.g., virtual radio frames FR_0B, FR_1B, FR_2B, FR_3B, or FR_4B) over the unlicensed radio frequency spectrum band. In some examples, the virtual radio frame transmissions by the eNB2 may by synchronized (or aligned) to a CET 895 of the eNB2.

In some examples, one or more extended CCA procedures performed by the eNB2 for accessing the unlicensed radio frequency spectrum band may take longer to complete because of transmissions made over the unlicensed radio frequency spectrum band by other nodes (e.g., transmissions by Wi-Fi nodes or eNBs of other operators). If the eNB1 and the eNB2 generate different random integers, N1 and N2, for performing extended CCA procedures, the transmissions may cause the eNB1 and the eNB2 to lose synchronization and operate asynchronously.

In some examples, the eNB2 may identify the first contention access protocol timing and align its contention access protocol timing (e.g., a second contention access protocol timing, for example, a second LBT-LBE timing) with the first contention access protocol timing. The second contention access protocol timing may be used by the eNB2 for accessing the unlicensed radio frequency spectrum band. In some examples, the aligning may be performed with respect to a synchronization boundary 892 occurring once every M radio frames in the first contention access protocol timing. By way of example, M is an integer greater than one in FIG. 8. In alternate examples, M may be equal to one.

In some examples, an alignment of a second contention access protocol timing with a first contention access protocol timing (as described, for example, in any of FIGS. 4-8) may be performed with tight backhaul coordination. For example, consider a cluster of small cells where backhaul signaling latency may be comparable to that of an extended CCA procedure duration. In such an example, backhaul signaling may be used to synchronize pseudo random number generators of a first node and at least a second node within the cluster of small cells. The tight backhaul coordination may also or alternately enable coordination of extended CCA procedures performed by the nodes of the cluster of small cells, and may enable synchronous access to a channel of an unlicensed radio frequency spectrum band by the nodes of the cluster of small cells. Successful CCA procedures and extended CCA procedures performed by the nodes of the cluster of small cells may be indicated to the other nodes of the cluster of small cells via the backhaul. In some examples, a central entity (e.g., a server or an eNB associated with the cluster of small cells) may coordinate attempts to access the channel of the unlicensed radio frequency spectrum band, or the transmission times over the channel of the unlicensed radio frequency spectrum band, so that channel access alignment is maintained within the cluster of small cells. In some examples, the cluster of small cells may be determined based at least in part on the nodes of the cluster of small cells being within CCA range of each other.

Figure 9:
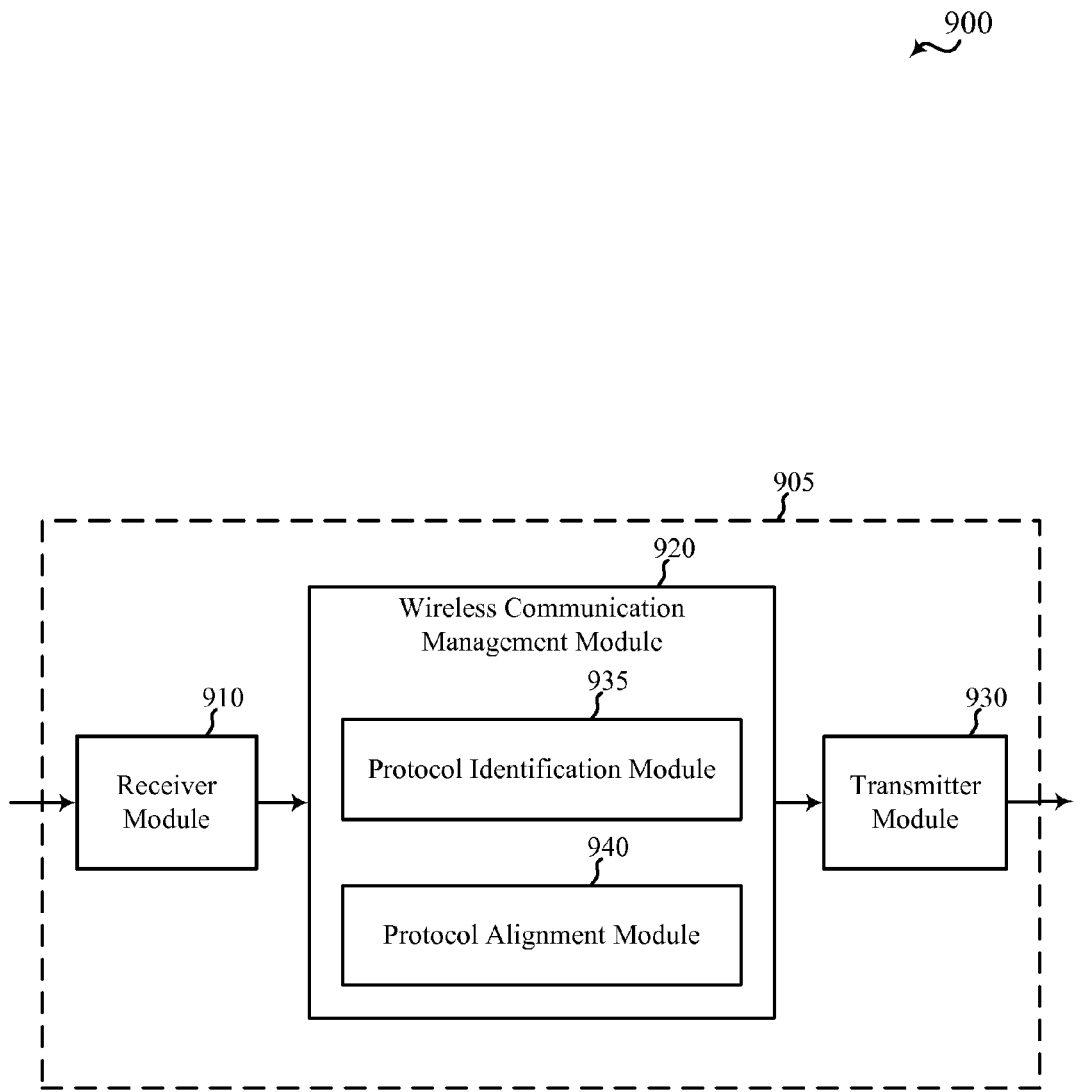
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105, 205, or 205-a described with reference to FIG. 1 or 2. In some examples, the apparatus 905 may be part or include an LTE/LTE-A eNB or an LTE/LTE-A base station. The apparatus 905 may also be a processor. In some examples described below, the apparatus 905 may be referred to as a first transmitter. The apparatus 905 may include a receiver module 910, a wireless communication management module 920, or a transmitter module 930. Each of these components may be in communication with each other.

The components of the apparatus 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to certain users, such as LTE/LTE-A users, for certain uses) or an unlicensed radio frequency spectrum band (e.g., a radio frequency spectrum band for which apparatuses may contend for access because the radio frequency spectrum band is available, at least in part, for unlicensed use, such as Wi-Fi use or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1-8. The receiver module 910 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 930 may include at least one RF transmitter, such as at least one RF transmitter operable to transmit over the licensed radio frequency spectrum band or the unlicensed radio frequency spectrum band. The transmitter module 930 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 920 may be used to manage various aspects of wireless communication with other apparatuses and may include a protocol identification module 935 or a protocol alignment module 945.

In some examples, the protocol identification module 935 may be used to identify a first contention access protocol timing for accessing an unlicensed radio frequency spectrum band. In some examples, the first contention access protocol may include an LBT-LBE protocol. In some examples, the first contention access protocol may be performed by a second transmitter. In some examples, the apparatus (or first transmitter) 905 and the second transmitter may be associated with the same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

In some examples, the protocol alignment module 940 may be used to align a second contention access protocol timing with the first contention access protocol timing. The second contention access protocol timing may be used by the apparatus 905 for accessing the unlicensed radio frequency spectrum band. In some examples, the second contention access protocol may include an LBT-LBE protocol.

Figure 10:
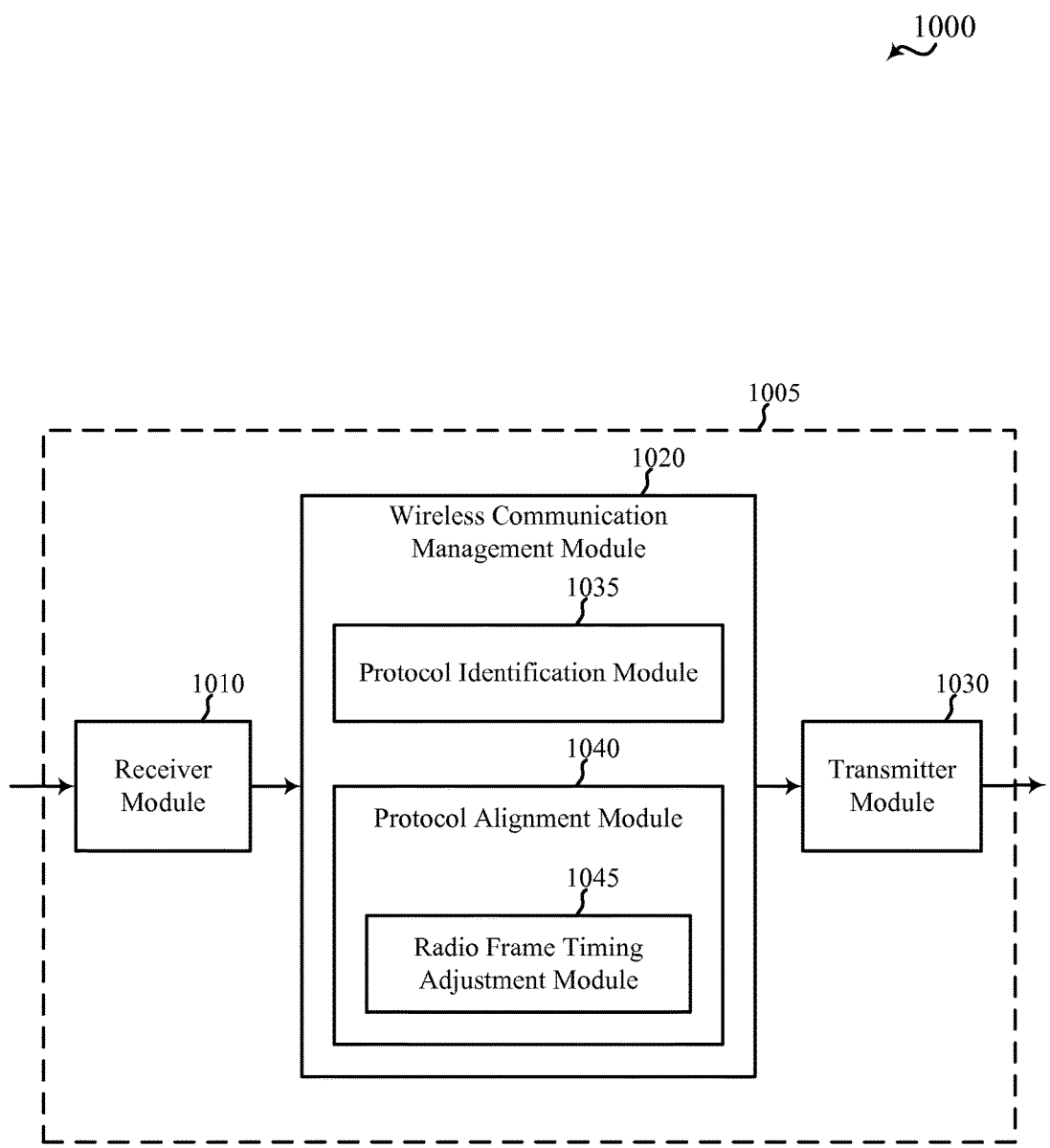
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105, 205, or 205-*a* described with reference to FIG. 1 or 2, or an example of aspects of the apparatus 905 described with reference to FIG. 9. In some examples, the apparatus 1005 may be part or include an LTE/LTE-A eNB or an LTE/LTE-A base station. The apparatus 1005 may also be a processor. In some examples described below, the apparatus 1005 may be referred to as a first transmitter. The apparatus 1005 may include a receiver module 1010, a wireless communication management module 1020, or a transmitter module 1030. Each of these components may be in communication with each other.

The components of the apparatus 1005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may be an example of one or more aspects of the receiver module 910 described with reference to FIG. 9. In some examples, the receiver module 1010 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to certain users, such as LTE/LTE-A users, for certain uses) or an unlicensed radio frequency spectrum band (e.g., a radio frequency spectrum band for which apparatuses may contend for access because the radio frequency spectrum band is available, at least in part, for unlicensed use, such as Wi-Fi use or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1-8.

The receiver module 1010 may in some cases include separate receivers for the licensed radio frequency spectrum band and the unlicensed radio frequency spectrum band. The separate receivers may, in some examples, take the form of a licensed RF spectrum band LTE/LTE-A receiver module 1012 for communicating over the licensed radio frequency spectrum band, and an unlicensed RF spectrum band LTE/LTE-A receiver module 1014 for communicating over the unlicensed radio frequency spectrum band. The receiver module 1010 may also include a backhaul receiver module 1016 for communicating over a wired or wireless backhaul that connects the apparatus 1005 to other apparatuses (e.g., to a second transmitter, such as a second LTE/LTE-A eNB or second LTE/LTE-A base station). The receiver module 1010 may also include receiver modules for communicating over other radio frequency spectrum bands or for communicating via other radio access technologies (e.g., Wi-Fi). The receiver module 1010, including the licensed RF spectrum band LTE/LTE-A receiver module 1012, the unlicensed RF spectrum band LTE/LTE-A receiver module 1014, or the backhaul receiver module 1016 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1030 may be an example of one or more aspects of the transmitter module 930 described with reference to FIG. 9. In some examples, the transmitter module 1030 may include at least one RF transmitter, such as at least one RF transmitter operable to transmit over the licensed radio frequency spectrum band or the unlicensed radio frequency spectrum band. The transmitter module 1030 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1032 for communicating over the licensed radio frequency spectrum band, and an unlicensed RF spectrum band LTE/LTE-A transmitter module 1034 for communicating over the unlicensed radio frequency spectrum band. The transmitter module 1030 may also include a backhaul transmitter module 1036 for communicating over a wired or wireless backhaul that connects the apparatus 1005 to other apparatuses. The transmitter module 1030, including the licensed RF spectrum band LTE/LTE-A transmitter module 1032, the unlicensed RF spectrum band LTE/LTE-A transmitter module 1034, or the backhaul transmitter module 1036 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1020 may be an example of one or more aspects of the wireless communication management module 920 described with reference to FIG. 9. The wireless communication management module 1020 may include a protocol identification module 1035 or a protocol alignment module 1040.

In some examples, the protocol identification module 1035 may be an example of one or more aspects of the protocol identification module 935 described with reference to FIG. 9. In some examples, the protocol identification module 1035 may be used to identify a first contention access protocol timing for accessing an unlicensed radio frequency spectrum band. In some examples, the first contention access protocol may include an LBT-LBE protocol. In some examples, the first contention access protocol may be performed by a second transmitter. In some examples, the apparatus (or first transmitter) 1005 and the second transmitter may be associated with the same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

In some examples, the protocol alignment module 1040 may be an example of one or more aspects of the protocol alignment module 940 described with reference to FIG. 9. In some examples, the protocol alignment module 1040 may be used to align a second contention access protocol timing with the first contention access protocol timing. The second contention access protocol timing may be used by the apparatus 1005 for accessing the unlicensed radio frequency spectrum band. In some examples, the second contention access protocol may include an LBT-LBE protocol.

In some examples, the protocol alignment module 1040 may include a radio frame timing adjustment module 1045. In some examples, the radio frame timing adjustment module 1045 may be used to adjust a timing of radio frame transmissions (e.g., virtual radio frame transmissions) by the apparatus 1005 in the unlicensed radio frequency spectrum band based at least in part on the first contention access protocol timing (e.g., based at least in part on the second contention access protocol timing being aligned with the first contention access protocol timing).

In some examples, the adjusting of the timing of radio frame transmissions performed by the radio frame timing adjustment module 1045 may include an adjusting of a duration of at least one radio frame (e.g., a virtual radio frame) transmitted by the first transmitter to coincide with a radio frame duration indicated by the first contention access protocol timing.

In some examples, the adjusting of the timing of radio frame transmissions performed by the radio frame timing adjustment module 1045 may include an adjusting of a radio frame ending of at least one radio frame (e.g., a virtual radio frame) transmitted by the first transmitter to coincide with a radio frame ending indicated by the first contention access protocol timing.

In some examples, the adjusting of the timing of radio frame transmissions performed by the radio frame timing adjustment module 1045 may include a shortening of a duration of at least one radio frame (e.g., a virtual radio frame) transmitted by the first transmitter with respect to a radio frame duration indicated by the first contention access protocol timing.

In some examples, the adjusting of the timing of radio frame transmissions performed by the radio frame timing adjustment module 1045 may include a skipping of at least one radio frame (e.g., a virtual radio frame) transmission indicated by the first contention access protocol timing.

Figure 11:
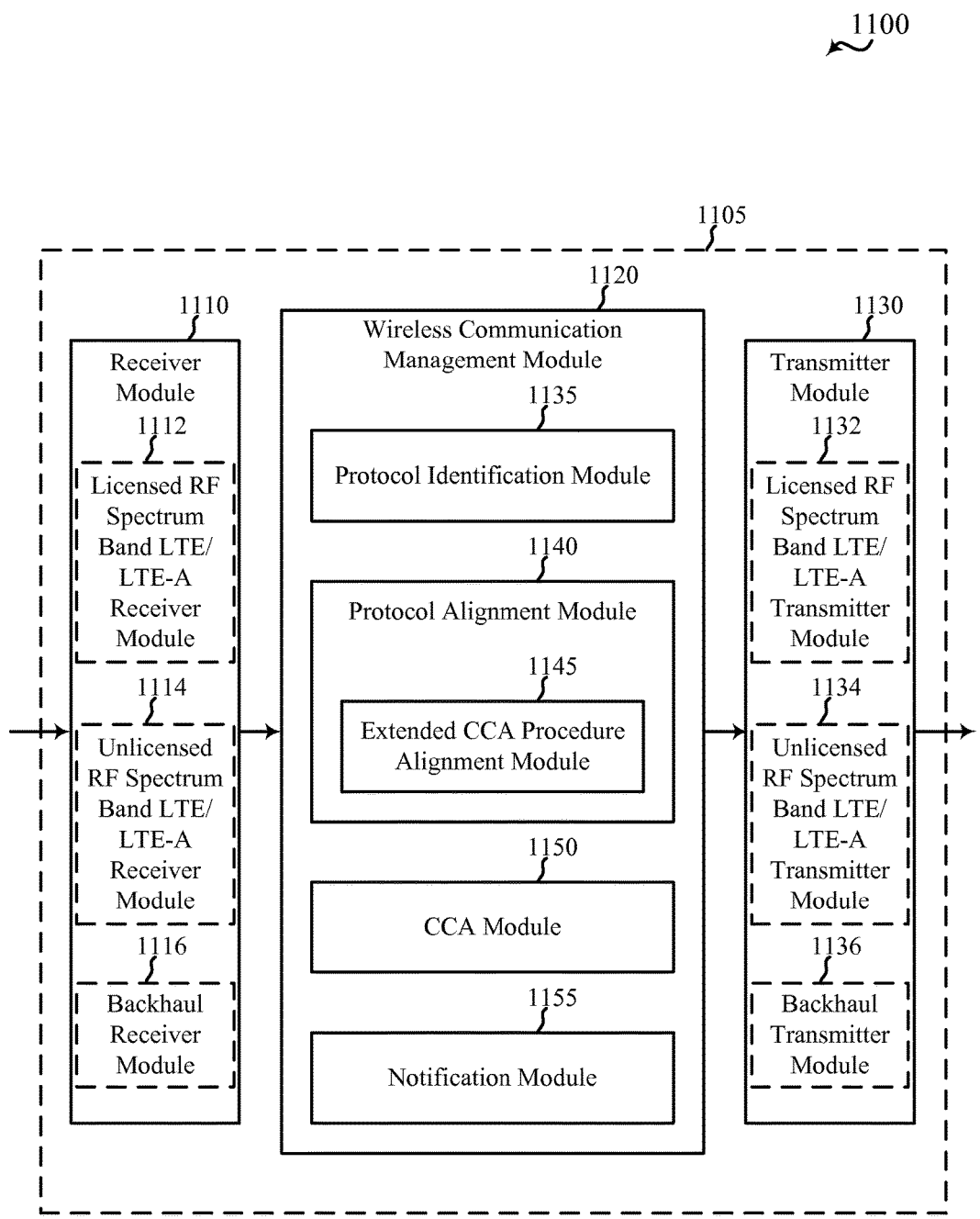
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. In some examples, the apparatus 1105 may be an example of aspects of one or more of the base stations 105, 205, or 205-*a* described with reference to FIG. 1 or 2, or an example of aspects of the apparatus 905 described with reference to FIG. 9. In some examples, the apparatus 1105 may be part or include an LTE/LTE-A eNB or an LTE/LTE-A base station. The apparatus 1105 may also be a processor. In some examples described below, the apparatus 1105 may be referred to as a first transmitter. The apparatus 1105 may include a receiver module 1110, a wireless communication management module 1120, or a transmitter module 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be an example of one or more aspects of the receiver module 910 described with reference to FIG. 9. In some examples, the receiver module 1110 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to certain users, such as LTE/LTE-A users, for certain uses) or an unlicensed radio frequency spectrum band (e.g., a radio frequency spectrum band for which apparatuses may contend for access because the radio frequency spectrum band is available, at least in part, for unlicensed use, such as Wi-Fi use or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1-8.

The receiver module 1110 may in some cases include separate receivers for the licensed radio frequency spectrum band and the unlicensed radio frequency spectrum band. The separate receivers may, in some examples, take the form of a licensed RF spectrum band LTE/LTE-A receiver module 1112 for communicating over the licensed radio frequency spectrum band, and an unlicensed RF spectrum band LTE/LTE-A receiver module 1114 for communicating over the unlicensed radio frequency spectrum band. The receiver module 1110 may also include a backhaul receiver module 1116 for communicating over a wired or wireless backhaul that connects the apparatus 1105 to other apparatuses (e.g., to a second transmitter, such as a second LTE/LTE-A eNB or second LTE/LTE-A base station). The receiver module 1110 may also include receiver modules for communicating over other radio frequency spectrum bands or for communicating via other radio access technologies (e.g., Wi-Fi). The receiver module 1110, including the licensed RF spectrum band LTE/LTE-A receiver module 1112, the unlicensed RF spectrum band LTE/LTE-A receiver module 1114, or the backhaul receiver module 1116 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1130 may be an example of one or more aspects of the transmitter module 930 described with reference to FIG. 9. In some examples, the transmitter module 1130 may include at least one RF transmitter, such as at least one RF transmitter operable to transmit over the licensed radio frequency spectrum band or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1132 for communicating over the licensed radio frequency spectrum band, and an unlicensed RF spectrum band LTE/LTE-A transmitter module 1134 for communicating over the unlicensed radio frequency spectrum band. The transmitter module 1130 may also include a backhaul transmitter module 1136 for communicating over a wired or wireless backhaul that connects the apparatus 1105 to other apparatuses. The transmitter module 1130, including the licensed RF spectrum band LTE/LTE-A transmitter module 1132, the unlicensed RF spectrum band LTE/LTE-A transmitter module 1134, or the backhaul transmitter module 1136 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1120 may be an example of one or more aspects of the wireless communication management module 920 described with reference to FIG. 9. The wireless communication management module 1120 may include a protocol identification module 1135, a protocol alignment module 1140, a CCA module 1150, or a notification module 1155.

In some examples, the protocol identification module 1135 may be an example of one or more aspects of the protocol identification module 935 described with reference to FIG. 9. In some examples, the protocol identification module 1135 may be used to identify a first contention access protocol timing for accessing an unlicensed radio frequency spectrum band. In some examples, the first contention access protocol may include an LBT-LBE protocol. In some examples, the first contention access protocol may be performed by a second transmitter. In some examples, the apparatus (or first transmitter) 1105 and the second transmitter may be associated with the same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

In some examples, the protocol alignment module 1140 may be an example of one or more aspects of the protocol alignment module 940 described with reference to FIG. 9. In some examples, the protocol alignment module 1140 may be used to align a second contention access protocol timing with the first contention access protocol timing. The second contention access protocol timing may be used by the apparatus 1105 for accessing the unlicensed radio frequency spectrum band. In some examples, the second contention access protocol may include an LBT-LBE protocol.

In some examples, the protocol alignment module 1140 may include an extended CCA procedure alignment module 1145. The extended CCA procedure alignment module 1145 may be used to align a first timing of a first extended CCA procedure performed by the apparatus 1105 with a second timing of a second extended CCA procedure indicated by the first contention access protocol timing. The first extended CCA procedure may be used by the apparatus 1105 to access the unlicensed radio frequency spectrum band.

In some examples, the aligning of the first timing of the first extended CCA procedure with the second timing of the second extended CCA procedure may include an aligning of a commencement of the first extended CCA procedure with a commencement of the second extended CCA procedure.

In some examples, the aligning of the first timing of the first extended CCA procedure with the second timing of the second extended CCA procedure may include an aligning of the first timing of the first extended CCA procedure with a synchronization boundary occurring once every M radio frames in the first contention access protocol timing. In some examples, M may be equal to one, as described, for example, with reference to FIGS. 4-7. In other examples, M may be an integer greater than one, as described, for example, with reference to FIG. 8.

In some examples, the aligning of the first timing of the first extended CCA procedure with the second timing of the second extended CCA procedure may include a syncing of a first random number generator on which the first extended CCA procedure is based with a second random number generator on which the second extended CCA procedure is based.

In some examples, the CCA module 1150 may be used to perform an extended CCA procedure such as the first extended CCA procedure. The CCA module 1150 may also be used to perform a non-extended CCA procedure (either alone, as part of an LBT-FBE protocol, or as part of a number of CCA procedures performed within an extended CCA procedure).

In some examples, the notification module 1155 may be used to notify at least one other apparatus (e.g., at least a second transmitter) when an extended CCA procedure (e.g., the first extended CCA procedure) is successful. The success of the extended CCA procedure may be indicated, for example, via a backhaul to which the first transmitter and at least the second transmitter are connected (e.g., via the backhaul transmitter module 1136). In some examples, the notification module 1155 may also or alternately be used to notify at least one other apparatus (e.g., at least the second transmitter) when a transmission by the first node over the unlicensed radio frequency spectrum band has completed. The completion may be indicated, for example, via the backhaul to which the first transmitter and at least the second transmitter are connected. In some examples, the at least second transmitter may be a node (e.g., a neighboring node) associated with a same operator as the first node.

Figure 12:
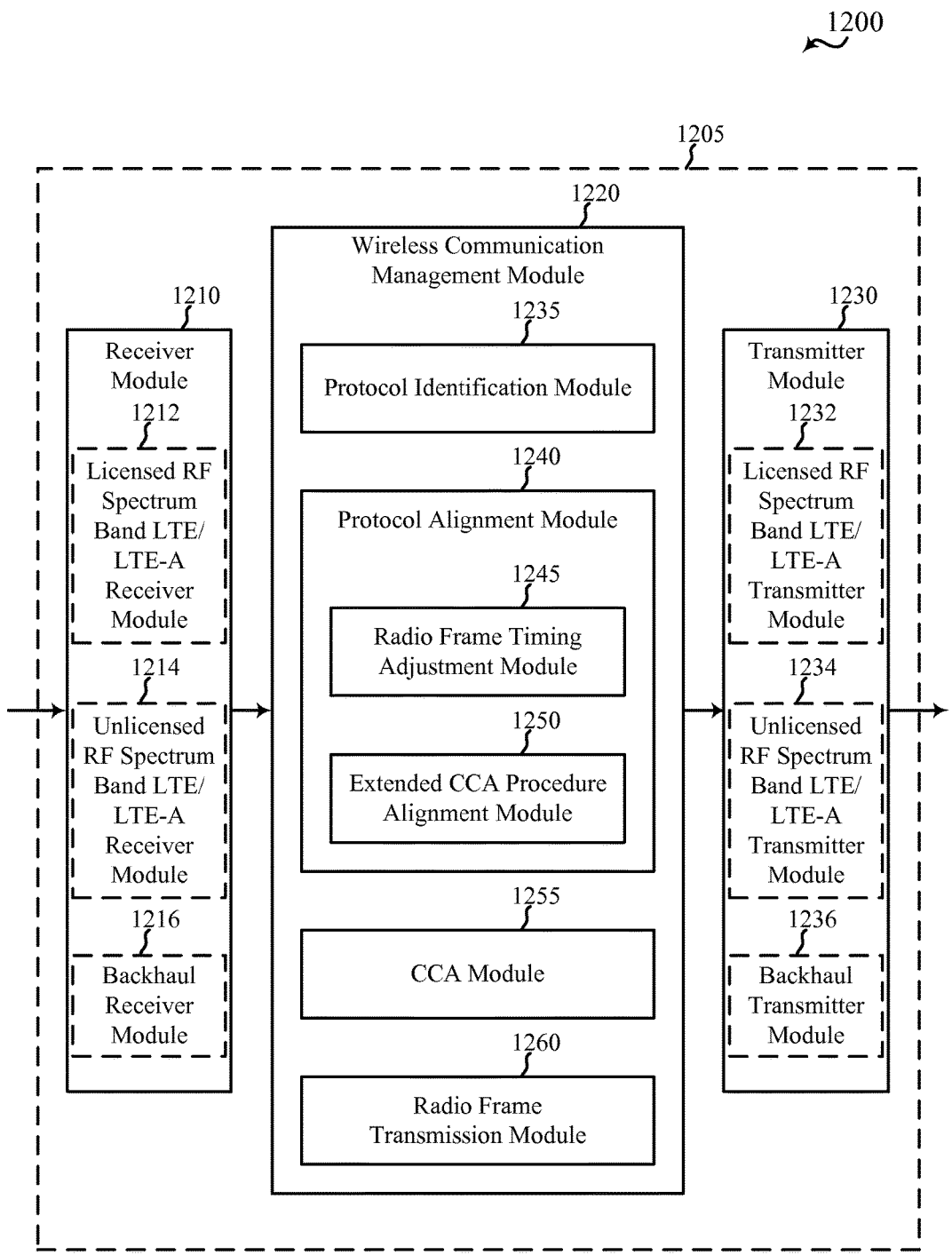
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of aspects of one or more of the base stations 105, 205, or 205-a described with reference to FIG. 1 or 2, or an example of aspects of one of the apparatuses 905, 1005, or 1105 described with reference to FIG. 9, 10, or 11. In some examples, the apparatus 1205 may be part or include an LTE/LTE-A eNB or an LTE/LTE-A base station. The apparatus 1205 may also be a processor. In some examples described below, the apparatus 1205 may be referred to as a first transmitter. The apparatus 1205 may include a receiver module 1210, a wireless communication management module 1220, or a transmitter module 1230. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may be an example of one or more aspects of the receiver module 910, 1010, or 1110 described with reference to FIG. 9, 10, or 11. In some examples, the receiver module 1210 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to certain users, such as LTE/LTE-A users, for certain uses) or an unlicensed radio frequency spectrum band (e.g., a radio frequency spectrum band for which apparatuses may contend for access because the radio frequency spectrum band is available, at least in part, for unlicensed use, such as Wi-Fi use or LTE/LTE-A use in an unlicensed radio frequency spectrum band). In some examples, the licensed radio frequency spectrum band or the unlicensed radio frequency spectrum band may be used for LTE/LTE-A communications, as described, for example, with reference to FIG. 1-8.

The receiver module 1210 may in some cases include separate receivers for the licensed radio frequency spectrum band and the unlicensed radio frequency spectrum band. The separate receivers may, in some examples, take the form of a licensed RF spectrum band LTE/LTE-A receiver module 1212 for communicating over the licensed radio frequency spectrum band, and an unlicensed RF spectrum band LTE/LTE-A receiver module 1214 for communicating over the unlicensed radio frequency spectrum band. The receiver module 1210 may also include a backhaul receiver module 1216 for communicating over a wired or wireless backhaul that connects the apparatus 1205 to other apparatuses (e.g., to a second transmitter, such as a second LTE/LTE-A eNB or second LTE/LTE-A base station). The receiver module 1210 may also include receiver modules for communicating over other radio frequency spectrum bands or for communicating via other radio access technologies (e.g., Wi-Fi). The receiver module 1210, including the licensed RF spectrum band LTE/LTE-A receiver module 1212, the unlicensed RF spectrum band LTE/LTE-A receiver module 1214, or the backhaul receiver module 1216 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1230 may be an example of one or more aspects of the transmitter module 930, 1030, or 1130 described with reference to FIG. 9, 10, or 11. In some examples, the transmitter module 1230 may include at least one RF transmitter, such as at least one RF transmitter operable to transmit over the licensed radio frequency spectrum band or the unlicensed radio frequency spectrum band. The transmitter module 1230 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1232 for communicating over the licensed radio frequency spectrum band, and an unlicensed RF spectrum band LTE/LTE-A transmitter module 1234 for communicating over the unlicensed radio frequency spectrum band. The transmitter module 1230 may also include a backhaul transmitter module 1236 for communicating over a wired or wireless backhaul that connects the apparatus 1205 to other apparatuses. The transmitter module 1230, including the licensed RF spectrum band LTE/LTE-A transmitter module 1232, the unlicensed RF spectrum band LTE/LTE-A transmitter module 1234, or the backhaul transmitter module 1236 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1220 may be an example of one or more aspects of the wireless communication management module 920, 1020, or 1120 described with reference to FIG. 9, 10, or 11. The wireless communication management module 1220 may include a protocol identification module 1235, a protocol alignment module 1240, a CCA module 1255, or a radio frame transmission module 1260.

In some examples, the protocol identification module 1235 may be an example of one or more aspects of the protocol identification module 935, 1035, or 1135 described with reference to FIG. 9, 10, or 11. In some examples, the protocol identification module 1235 may be used to identify a first contention access protocol timing for accessing an unlicensed radio frequency spectrum band. In some examples, the first contention access protocol may include an LBT-LBE protocol. In some examples, the first contention access protocol may be performed by a second transmitter. In some examples, the apparatus (or first transmitter) 1205 and the second transmitter may be associated with the same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

In some examples, the protocol alignment module 1240 may be an example of one or more aspects of the protocol alignment module 940, 1040, or 1140 described with reference to FIG. 9, 10, or 11. In some examples, the protocol alignment module 1240 may be used to align a second contention access protocol timing with the first contention access protocol timing. The second contention access protocol timing may be used by the apparatus 1205 for accessing the unlicensed radio frequency spectrum band. In some examples, the second contention access protocol may include an LBT-LBE protocol.

In some examples, the protocol alignment module 1240 may include a radio frame timing adjustment module 1245 or an extended CCA procedure alignment module 1250. In some examples, the radio frame timing adjustment module 1245 may be used to adjust a timing of radio frame transmissions (e.g., virtual radio frame transmissions) by the apparatus 1205 in the unlicensed radio frequency spectrum band based at least in part on the first contention access protocol timing (e.g., based at least in part on the second contention access protocol timing being aligned with the first contention access protocol timing).

In some examples, the adjusting of the timing of radio frame transmissions performed by the radio frame timing adjustment module 1245 may include an adjusting of a duration of at least one radio frame (e.g., a virtual radio frame) transmitted by the first transmitter to coincide with a radio frame duration indicated by the first contention access protocol timing.

In some examples the adjusting of the timing of radio frame transmissions performed by the radio frame timing adjustment module 1245 may include an adjusting of a radio frame ending of at least one radio frame (e.g., a virtual radio frame) transmitted by the first transmitter to coincide with a radio frame ending indicated by the first contention access protocol timing.

In some examples, the adjusting of the timing of radio frame transmissions performed by the radio frame timing adjustment module 1245 may include a shortening of a duration of at least one radio frame (e.g., a virtual radio frame) transmitted by the first transmitter with respect to a radio frame duration indicated by the first contention access protocol timing.

In some examples, the adjusting of the timing of radio frame transmissions performed by the radio frame timing adjustment module 1245 may include a skipping of at least one radio frame (e.g., a virtual radio frame) transmission indicated by the first contention access protocol timing.

In some examples, the extended CCA procedure alignment module 1250 may be used to align a first timing of a first extended CCA procedure performed by the apparatus 1205 with a second timing of a second extended CCA procedure indicated by the first contention access protocol timing. The first extended CCA procedure may be used by the apparatus 1205 to access the unlicensed radio frequency spectrum band.

In some examples, the aligning of the first timing of the first extended CCA procedure with the second timing of the second extended CCA procedure may include an aligning of a commencement of the first extended CCA procedure with a commencement of the second extended CCA procedure.

In some examples, the aligning of the first timing of the first extended CCA procedure with the second timing of the second extended CCA procedure may include an aligning of the first timing of the first extended CCA procedure with a synchronization boundary occurring once every M radio frames in the first contention access protocol timing. In some examples, M may be equal to one, as described, for example, with reference to FIGS. 4-7. In other examples, M may be an integer greater than one, as described, for example, with reference to FIG. 8.

In some examples, the aligning of the first timing of the first extended CCA procedure with the second timing of the second extended CCA procedure may include a syncing of a first random number generator on which the first extended CCA procedure is based with a second random number generator on which the second extended CCA procedure is based.

In some examples, the CCA module 1255 may be an example of one or more aspects of the CCA module 1150 described with reference to FIG. 11. In some examples, the CCA module 1255 may be used to perform an extended CCA procedure such as the first extended CCA procedure. The CCA module 1255 may also be used to perform a non-extended CCA procedure (either alone, as part of an LBT-FBE protocol, or as part of a number of CCA procedures performed within an extended CCA procedure). In some examples, a successful extended CCA procedure may be indicated to at least one other apparatus (e.g., at least a second transmitter). The success may be indicated, for example, via a backhaul to which the apparatus 1205 and at least the second transmitter are connected.

In some examples, the radio frame transmission module 1260 may be used to transmit a radio frame (e.g. a virtual radio frame) over the unlicensed radio frequency spectrum band. Transmission of the radio frame may be based at least in part on an extended CCA procedure corresponding to the radio frame being successful, and based at least in part on the second contention access protocol timing being aligned with the first contention access protocol timing (e.g., based on one or more adjustments made by the radio frame timing adjustment module 1245) When an extended CCA procedure performed by the CCA module 1255 fails, the radio frame transmission module 1260 may skip radio frame transmission until a subsequent successful CCA procedure (e.g., a subsequent successful CCA procedure or a subsequent successful extended CCA procedure).

Figure 13:
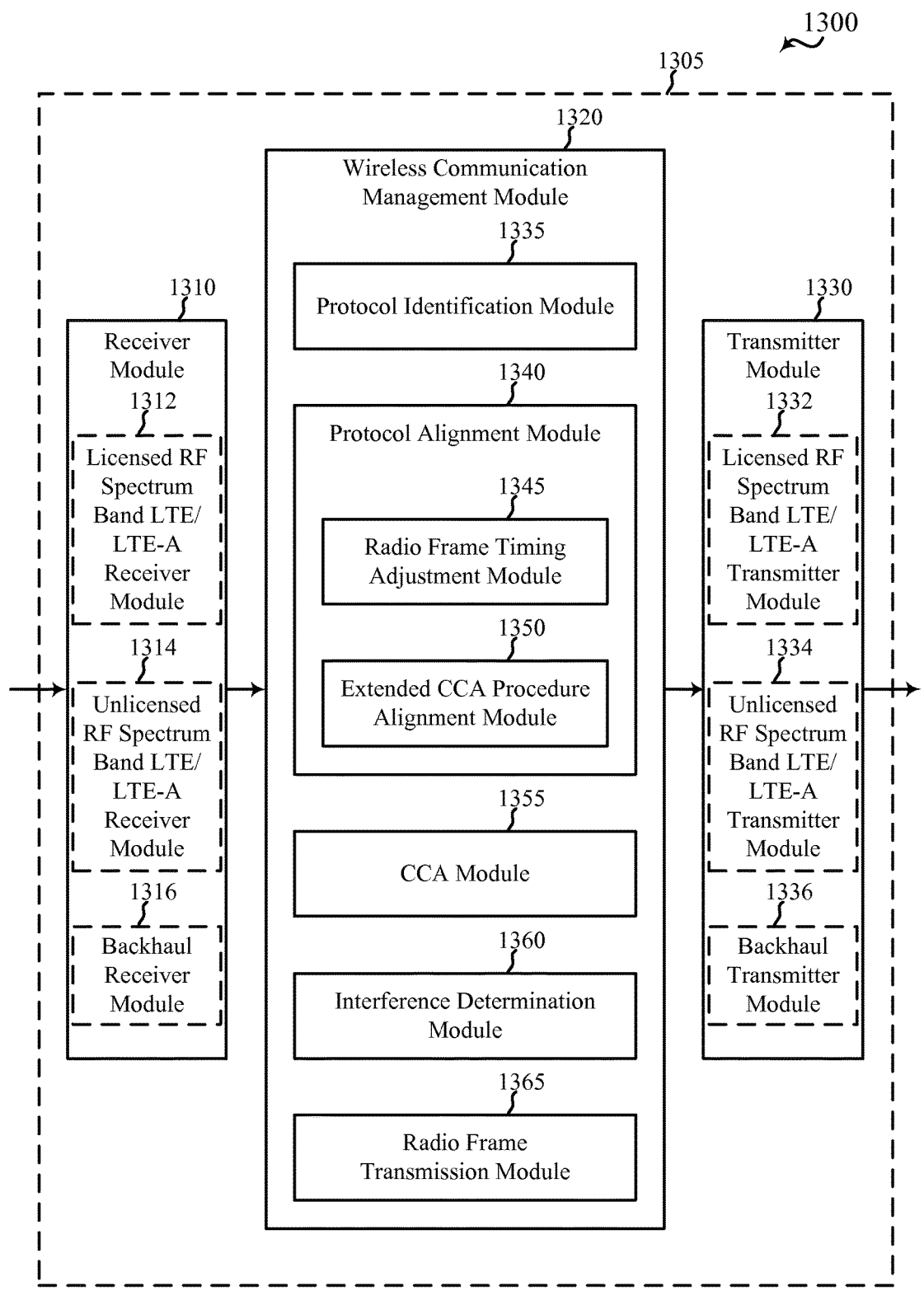
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. In some examples, the apparatus 1305 may be an example of aspects of one or more of the base stations 105, 205, or 205-*a* described with reference to FIG. 1 or 2, or an example of aspects of one of the apparatuses 905, 1005, 1105, or 1205 described with reference to FIG. 9, 10, 11, or 12. In some examples, the apparatus 1305 may be part or include an LTE/LTE-A eNB or an LTE/LTE-A base station. The apparatus 1305 may also be a processor. In some examples described below, the apparatus 1305 may be referred to as a first transmitter. The apparatus 1305 may include a receiver module 1310, a wireless communication management module 1320, or a transmitter module 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be an example of one or more aspects of the receiver module 910, 1010, 1110, or 1210 described with reference to FIG. 9, 10, 11, or 12. In some examples, the receiver module 1310 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to certain users (e.g., LTE/LTE-A users) for certain uses) or an unlicensed radio frequency spectrum band (e.g., a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-8. The receiver module 1310 may in some cases include separate receivers for the licensed radio frequency spectrum band and the unlicensed radio frequency spectrum band. The separate receivers may, in some examples, take the form of a licensed RF spectrum band LTE/LTE-A receiver module 1312 for communicating over the licensed radio frequency spectrum band, and an unlicensed RF spectrum band LTE/LTE-A receiver module 1314 for communicating over the unlicensed radio frequency spectrum band. The receiver module 1310 may also include a backhaul receiver module 1316 for communicating over a wired or wireless backhaul that connects the apparatus 1305 to other apparatuses (e.g., to a second transmitter, such as a second LTE/LTE-A eNB or second LTE/LTE-A base station). The receiver module 1310 may also include receiver modules for communicating over other radio frequency spectrum bands or for communicating via other radio access technologies (e.g., Wi-Fi). The receiver module 1310, including the licensed RF spectrum band LTE/LTE-A receiver module 1312, the unlicensed RF spectrum band LTE/LTE-A receiver module 1314, or the backhaul receiver module 1316 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1330 may be an example of one or more aspects of the transmitter module 930, 1030, 1130, or 1230 described with reference to FIG. 9, 10, 11, or 12. In some examples, the transmitter module 1330 may include at least one RF transmitter, such as at least one RF transmitter operable to transmit over the licensed radio frequency spectrum band or the unlicensed radio frequency spectrum band. The transmitter module 1330 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1332 for communicating over the licensed radio frequency spectrum band, and an unlicensed RF spectrum band LTE/LTE-A transmitter module 1334 for communicating over the unlicensed radio frequency spectrum band. The transmitter module 1330 may also include a backhaul transmitter module 1336 for communicating over a wired or wireless backhaul that connects the apparatus 1305 to other apparatuses. The transmitter module 1330, including the licensed RF spectrum band LTE/LTE-A transmitter module 1332, the unlicensed RF spectrum band LTE/LTE-A transmitter module 1334, or the backhaul transmitter module 1336 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1320 may be an example of one or more aspects of the wireless communication management module 920, 1020, 1120, or 1220 described with reference to FIG. 9, 10, 11, or 12. The wireless communication management module 1320 may include a protocol identification module 1335, a protocol alignment module 1340, a CCA module 1355, an interference determination module 1360, or a radio frame transmission module 1365.

In some examples, the protocol identification module 1335 may be an example of one or more aspects of the protocol identification module 935, 1035, 1135, or 1235 described with reference to FIG. 9, 10, 11, or 12. In some examples, the protocol identification module 1335 may be used to identify a first contention access protocol timing for accessing an unlicensed radio frequency spectrum band. In some examples, the first contention access protocol may include an LBT-LBE protocol. In some examples, the first contention access protocol may be performed by a second transmitter. In some examples, the apparatus (or first transmitter) 1305 and the second transmitter may be associated with the same operator. In some examples, the first contention access protocol may be a reference contention access protocol. In some examples, the first contention access protocol timing may indicate a timing of radio frame (e.g., virtual radio frame) transmissions based at least in part on a continuum of successful extended CCA procedures and a fixed number of CCA procedures per extended CCA procedure.

In some examples, the protocol alignment module 1340 may be an example of one or more aspects of the protocol alignment module 940, 1040, 1140, or 1240 described with reference to FIG. 9, 10, 11, or 12. In some examples, the protocol alignment module 1340 may be used to align a second contention access protocol timing with the first contention access protocol timing. The second contention access protocol timing may be used by the apparatus 1305 for accessing the unlicensed radio frequency spectrum band.

In some examples, the second contention access protocol may include an LBT-LBE protocol.

In some examples, the protocol alignment module 1340 may include a radio frame timing adjustment module 1345 or an extended CCA procedure alignment module 1350. In some examples, the radio frame timing adjustment module 1345 may be used to adjust a timing of radio frame (e.g., virtual radio frame) transmissions by the apparatus 1305 in the unlicensed radio frequency spectrum band based at least in part on the first contention access protocol timing (e.g., based at least in part on the second contention access protocol timing being aligned with the first contention access protocol timing).

In some examples, the adjusting of the timing of radio frame transmissions performed by the radio frame timing adjustment module 1345 may include an adjusting of a duration of at least one radio frame (e.g., a virtual radio frame) transmitted by the first transmitter to coincide with a radio frame duration indicated by the first contention access protocol timing.

In some examples the adjusting of the timing of radio frame transmissions performed by the radio frame timing adjustment module 1345 may include an adjusting of a radio frame ending of at least one radio frame (e.g., a virtual radio frame) transmitted by the first transmitter to coincide with a radio frame ending indicated by the first contention access protocol timing.

In some examples, the adjusting of the timing of radio frame transmissions performed by the radio frame timing adjustment module 1345 may include a shortening of a duration of at least one radio frame (e.g., a virtual radio frame) transmitted by the first transmitter with respect to a radio frame duration indicated by the first contention access protocol timing.

In some examples, the adjusting of the timing of radio frame transmissions performed by the radio frame timing adjustment module 1345 may include a skipping of at least one radio frame transmission indicated by the first contention access protocol timing.

In some examples, the extended CCA procedure alignment module 1350 may be used to align a first timing of a first extended CCA procedure performed by the apparatus 1305 with a second timing of a second extended CCA procedure indicated by the first contention access protocol timing. The first extended CCA procedure may be used by the apparatus 1305 to access the unlicensed radio frequency spectrum band.

In some examples, the aligning of the first timing of the first extended CCA procedure with the second timing of the second extended CCA procedure may include an aligning of a commencement of the first extended CCA procedure with a commencement of the second extended CCA procedure.

In some examples, the aligning of the first timing of the first extended CCA procedure with the second timing of the second extended CCA procedure may include an aligning of the first timing of the first extended CCA procedure with a synchronization boundary occurring once every M radio frames in the first contention access protocol timing. In some examples, M may be equal to one, as described, for example, with reference to FIGS. 4-7. In other examples, M may be an integer greater than one, as described, for example, with reference to FIG. 8.

In some examples, the aligning of the first timing of the first extended CCA procedure with the second timing of the second extended CCA procedure may include a syncing of a first random number generator on which the first extended CCA procedure is based with a second random number generator on which the second extended CCA procedure is based.

In some examples, the CCA module 1355 may be an example of one or more aspects of the CCA module 1150 or 1255 described with reference to FIG. 11 or 12. In some examples, the CCA module 1355 may be used to perform an extended CCA procedure such as the first extended CCA procedure. The CCA module 1355 may also be used to perform a non-extended CCA procedure (either alone, as part of an LBT-FBE protocol, or as part of a number of CCA procedures performed within an extended CCA procedure). In some examples, a successful extended CCA procedure may be indicated to at least one other apparatus (e.g., at least a second transmitter). The success may be indicated, for example, via a backhaul to which the apparatus 1305 and at least the second transmitter are connected.

In some examples, the interference determination module 1360 may be used to determine whether transmission of a radio frame (e.g., a virtual radio frame) over the unlicensed radio frequency spectrum band by the apparatus (a first transmitter) 1305 will interfere with at least a second transmitter performing the second extended CCA procedure or a third extended CCA procedure, where the third extended CCA procedure is aligned with the first extended CCA procedure. In some examples, the determining whether transmission of the radio frame over the unlicensed radio frequency spectrum band by the apparatus 1305 will interfere with at least the second transmitter performing the second extended CCA procedure or the third extended CCA procedure may include syncing a first random number generator on which the first extended CCA procedure is based with a second random number generator on which the second extended CCA procedure is based. That is, the syncing of the random number generators may be used to determine whether an interference condition exists.

In some examples, the radio frame transmission module 1365 may be an example of one or more aspects of the radio frame transmission module 1260 described with reference to FIG. 12. In some examples, the radio frame transmission module 1365 may be used to transmit a radio frame (e.g., a virtual radio frame) over the unlicensed radio frequency spectrum band. Transmission of the radio frame may be based at least in part on an extended CCA procedure corresponding to the radio frame being successful, based at least in part on a determination (e.g., by the interference determination module 1360) that interference will not occur, and based at least in part on the second contention access protocol timing being aligned with the first contention access protocol timing (e.g., based on one or more adjustments made by the radio frame timing adjustment module 1345) When an extended CCA procedure performed by the CCA module 1355 fails, or when there is a determination (e.g., by the interference determination module 1360) that transmission of the radio frame will interfere with at least the second transmitter performing the second extended CCA procedure or the third extended CCA procedure, the radio frame transmission module 1365 may skip radio frame transmission until a subsequent successful CCA procedure (e.g., a subsequent successful CCA procedure or a subsequent successful extended CCA procedure).

Figure 14:
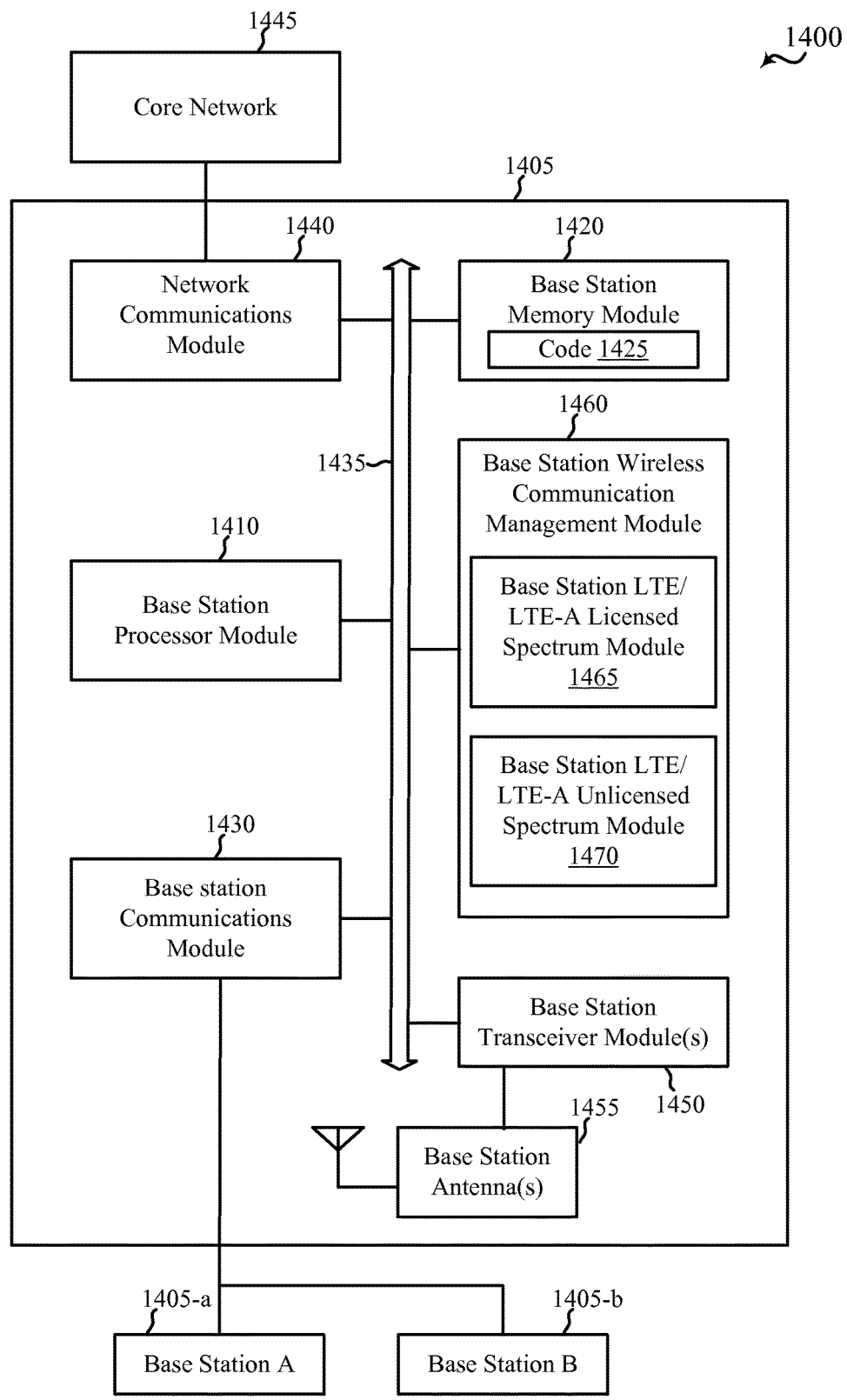
FIG. 14 shows a block diagram of a base station (e.g., a base station forming part or all of an eNB) for use in wireless communication, in accordance with various aspects of the present disclosure.

FIG. 14 shows a block diagram 1400 of a base station 1405 (e.g., a base station forming part or all of an eNB) for use in wireless communication, in accordance with various aspects of the present disclosure. In some examples, the base station 1405 may be an example of aspects of one or more of the base stations 105, 205, or 205-*a* described with reference to FIG. 1 or 2, or aspects of one or more of the apparatuses 905, 1005, 1105, 1205, or 1305 when configured as a base station, as described with reference to FIG. 9, 10, 11, 12, or 13. The base station 1405 may be configured to implement or facilitate at least some of the base station or apparatus features and functions described with reference to FIG. 1-13.

The base station 1405 may include a base station processor module 1410, a base station memory module 1420, at least one base station transceiver module (represented by base station transceiver module(s) 1450), at least one base station antenna (represented by base station antenna(s) 1455), or a base station wireless communication management module 1460. The base station 1405 may also include one or more of a base station communications module 1430 or a network communications module 1440. Each of these components may be in communication with each other, directly or indirectly, over one or more buses 1435.

The base station memory module 1420 may include random access memory (RAM) or read-only memory (ROM). The base station memory module 1420 may store computer-readable, computer-executable code 1425 containing instructions that are configured to, when executed, cause the base station processor module 1410 to perform various functions described herein related to wireless communication (e.g., functions relating to identification and alignment of contention access protocol timings when using an LBT-LTE protocol, etc.). Alternatively, the code 1425 may not be directly executable by the base station processor module 1410 but be configured to cause the base station 1405 (e.g., when compiled and executed) to perform various of the functions described herein.

The base station processor module 1410 may include an intelligent hardware device, e.g., a central processing unit (CPU), a microcontroller, an ASIC, etc. The base station processor module 1410 may process information received through the base station transceiver module(s) 1450, the base station communications module 1430, or the network communications module 1440. The base station processor module 1410 may also process information to be sent to the transceiver module(s) 1450 for transmission through the antenna(s) 1455, to the base station communications module 1430, for transmission to one or more other base stations 1405-a and 1405-b, or to the network communications module 1440 for transmission to a core network 1445, which may be an example of one or more aspects of the core network 130 described with reference to FIG. 1. The base station processor module 1410 may handle, alone or in connection with the base station wireless communication management module 1460, various aspects of communicating over (or managing communications over) a wireless communication medium including a first radio frequency spectrum band (e.g., a radio frequency spectrum band for which apparatuses do not contend for access because the radio frequency spectrum band is licensed to certain users for certain uses, such as a licensed radio frequency spectrum band usable for LTE/LTE-A communications) or a second radio frequency spectrum band (e.g., a radio frequency spectrum band for which apparatuses may contend for access because the radio frequency spectrum band is available, at least in part, for unlicensed use, such as Wi-Fi use or LTE/LTE-A use in an unlicensed radio frequency spectrum band).

The base station transceiver module(s) 1450 may include a modem configured to modulate packets and provide the modulated packets to the base station antenna(s) 1455 for transmission, and to demodulate packets received from the base station antenna(s) 1455. The base station transceiver module(s) 1450 may, in some examples, be implemented as one or more base station transmitter modules and one or more separate base station receiver modules. The base station transceiver module(s) 1450 may support communications in the first radio frequency spectrum band or the second radio frequency spectrum band. The base station transceiver module(s) 1450 may be configured to communicate bi-directionally, via the antenna(s) 1455, with one or more UEs or apparatuses, such as one or more of the UEs 115, 215, 215-a, 215-b, or 215-c described with reference to FIG. 1 or 2. The base station 1405 may, for example, include multiple base station antennas 1455 (e.g., an antenna array). The base station 1405 may communicate with the core network 1445 through the network communications module 1440. The base station 1405 may also communicate with other base stations, such as the base stations 1405-a and 1405-b, using the base station communications module 1430.

The base station wireless communication management module 1460 may be configured to perform or control some or all of the features or functions described with reference to FIG. 1-13 related to wireless communication (e.g., functions relating to identification and alignment of contention access protocol timings when using an LBT-LTE protocol, etc.). In some examples, the base station wireless communication management module 1460 may be configured to support a supplemental downlink mode, a carrier aggregation mode, or a standalone mode using the first radio frequency spectrum band or the second radio frequency spectrum band. The base station wireless communication management module 1460 may include a base station LTE/LTE-A licensed spectrum module 1465 configured to handle LTE/LTE-A communications in the first radio frequency spectrum band, and a base station LTE/LTE-A unlicensed spectrum module 1470 configured to handle LTE/LTE-A communications in the second radio frequency spectrum band. The base station wireless communication management module 1460, or portions of it, may include a processor, or some or all of the functions of the base station wireless communication management module 1460 may be performed by the base station processor module 1410 or in connection with the base station processor module 1410. In some examples, the base station wireless communication management module 1460 may be an example of the wireless communication management module 920, 1020, 1120, 1220, or 1320 described with reference to FIG. 9, 10, 11, 12, or 13.

Figure 15:
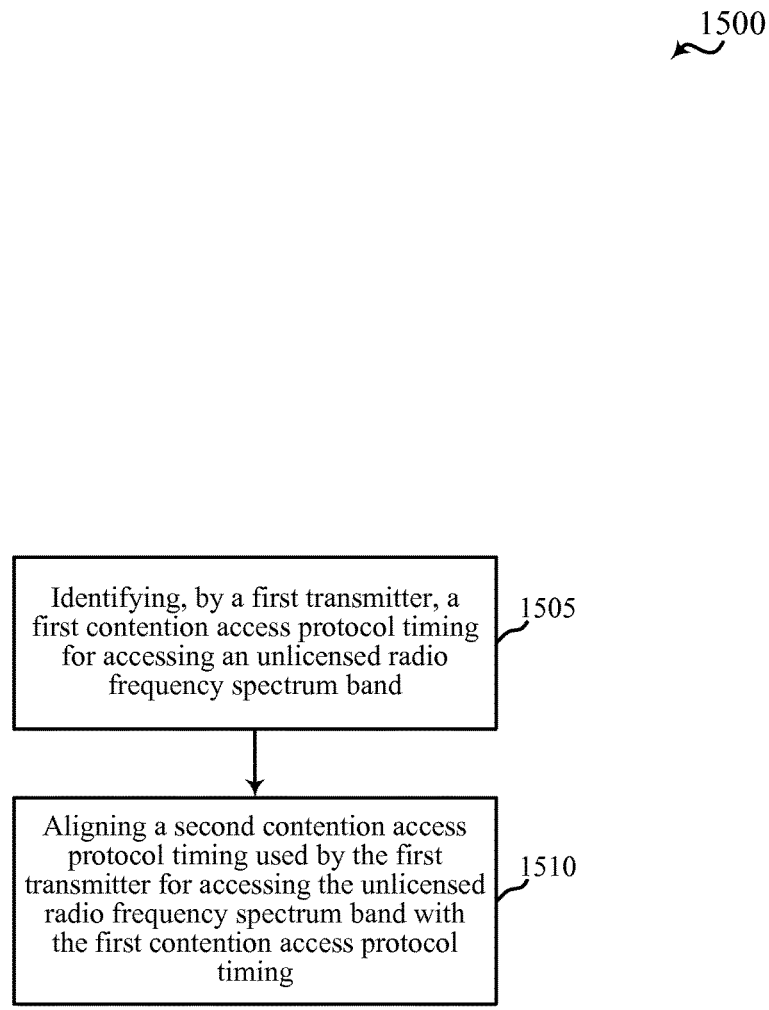
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105, 205, 205-a, or 1405 described with reference to FIG. 1, 2, or 14, or aspects of one or more of the apparatuses 905, 1005, 1105, 1205, or 1305 described with reference to FIG. 9, 10, 11, 12, or 13. In some examples, a base station or apparatus may execute one or more sets of codes to control the functional elements of the base station or apparatus to perform the functions described below.

At block 1505, the method 1500 may include identifying, by a first transmitter, a first contention access protocol timing for accessing an unlicensed radio frequency spectrum band. In some examples, the first transmitter may include an LTE/LTE-A eNB or LTE/LTE-A base station. In some examples, the first contention access protocol may include an LBT-LBE protocol. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

In some examples of the method 1500, the first contention access protocol may be performed by a second transmitter. In some examples, the first transmitter and the second transmitter may be associated with a same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

The operation(s) at block 1505 may be performed using the wireless communication management module 920, 1020, 1120, 1220, 1320, or 1460 described with reference to FIG. 9, 10, 11, 12, 13, or 14, or the protocol identification module 935, 1035, 1135, 1235, or 1335 described with reference to FIG. 9, 10, 11, 12, or 13.

At block 1510, the method 1500 may include aligning a second contention access protocol timing with the first contention access protocol timing. The second contention access protocol timing may be used by the first transmitter for accessing the unlicensed radio frequency spectrum band. In some examples, the second contention access protocol may include an LBT-LBE protocol. The operation(s) at block 1510 may be performed using the wireless communication management module 920, 1020, 1120, 1220, 1320, or 1460 described with reference to FIG. 9, 10, 11, 12, 13, or 14, or the protocol alignment module 940, 1040, 1140, 1240, or 1340 described with reference to FIG. 9, 10, 11, 12, or 13.

In some examples of the method 1500, the first transmitter and at least a second transmitter may be associated with a same operator, and the method 1500 may include aligning at least a third contention access protocol timing used by at least the second transmitter with the first contention access protocol timing. The at least third contention access protocol timing may be used by the at least second transmitter.

Thus, the method 1500 may provide for wireless communication. It should be noted that the method 1500 is just one implementation and that the operations of the method 1500 may be rearranged or otherwise modified such that other implementations are possible.

Figure 16:
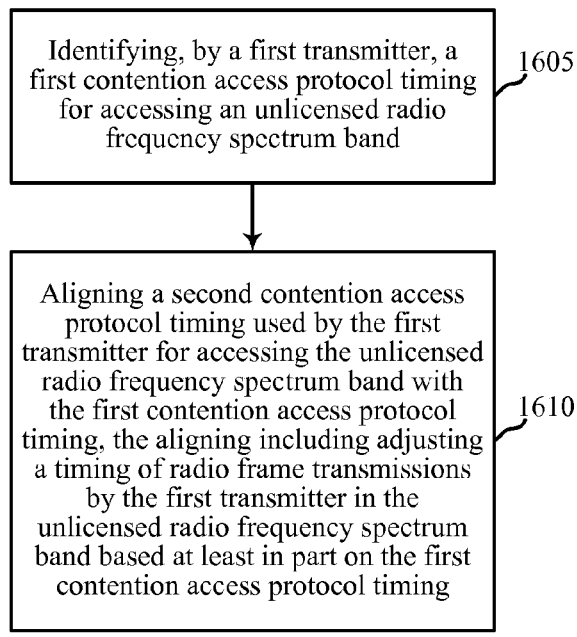
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105, 205, 205-a, or 1405 described with reference to FIG. 1, 2, or 14, or aspects of one or more of the apparatuses 905, 1005, 1105, 1205, or 1305 described with reference to FIG. 9, 10, 11, 12, or 13. In some examples, a base station or apparatus may execute one or more sets of codes to control the functional elements of the base station or apparatus to perform the functions described below.

At block 1605, the method 1600 may include identifying, by a first transmitter, a first contention access protocol timing for accessing an unlicensed radio frequency spectrum band. In some examples, the first transmitter may include an LTE/LTE-A eNB or LTE/LTE-A base station. In some examples, the first contention access protocol may include an LBT-LBE protocol. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

In some examples of the method 1600, the first contention access protocol may be performed by a second transmitter. In some examples, the first transmitter and the second transmitter may be associated with a same operator. In some examples, the first contention access protocol may be a reference contention access protocol. In some examples, the first contention access protocol timing may indicate a timing of radio frame transmissions based at least in part on a continuum of successful extended CCA procedures and a fixed number of CCA procedures per extended CCA procedure.

The operation(s) at block 1605 may be performed using the wireless communication management module 920, 1020, 1120, 1220, 1320, or 1460 described with reference to FIG. 9, 10, 11, 12, 13, or 14, or the protocol identification module 935, 1035, 1135, 1235, or 1335 described with reference to FIG. 9, 10, 11, 12, or 13.

At block 1610, the method 1600 may include aligning a second contention access protocol timing with the first contention access protocol timing. The second contention access protocol timing may be used by the first transmitter for accessing the unlicensed radio frequency spectrum band. The aligning may include adjusting a timing of radio frame transmissions (e.g., virtual radio frame transmissions) by the first transmitter in the unlicensed radio frequency spectrum band based at least in part on the first contention access protocol timing (e.g., based at least in part on the second contention access protocol timing being aligned with the first contention access protocol timing). In some examples, the second contention access protocol may include an LBT-LBE protocol.

In some examples of the operation(s) at block 1610, the adjusting the timing of radio frame transmissions by the first transmitter may include adjusting a duration of at least one radio frame (e.g., a virtual radio frame) transmitted by the first transmitter to coincide with a radio frame duration indicated by the first contention access protocol timing.

In some examples of the operation(s) at block 1610, the adjusting the timing of radio frame transmissions by the first transmitter may include adjusting a radio frame ending of at least one radio frame (e.g., a virtual radio frame) transmitted by the first transmitter to coincide with a radio frame ending indicated by the first contention access protocol timing.

In some examples of the operation(s) at block 1610, the adjusting the timing of radio frame transmissions by the first transmitter may include shortening a duration of at least one radio frame (e.g., a virtual radio frame) transmitted by the first transmitter with respect to a radio frame duration indicated by the first contention access protocol timing.

In some examples of the operation(s) at block 1610, the adjusting the timing of radio frame transmissions by the first transmitter may include skipping at least one radio frame transmission indicated by the first contention access protocol timing.

The operation(s) at block 1610 may be performed using the wireless communication management module 920, 1020, 1120, 1220, 1320, or 1460 described with reference to FIG. 9, 10, 11, 12, 13, or 14, the protocol alignment module 940, 1040, 1140, 1240, or 1340 described with reference to FIG. 9, 10, 11, 12, or 13, or the radio frame timing adjustment module 1045 described with reference to FIG. 10.

In some examples of the method 1600, the first transmitter and at least a second transmitter may be associated with a same operator, and the method 1600 may include aligning at least a third contention access protocol timing used by at least the second transmitter with the first contention access protocol timing. The at least third contention access protocol timing may be used by the at least second transmitter. In some examples, the aligning of at least a third contention access protocol timing with the first contention access protocol may include adjusting a timing of radio frame transmissions (e.g., virtual radio frame transmissions) by at least the second transmitter in the unlicensed radio frequency spectrum, based at least in part on the first contention access protocol timing.

Thus, the method 1600 may provide for wireless communication. It should be noted that the method 1600 is just one implementation and that the operations of the method 1600 may be rearranged or otherwise modified such that other implementations are possible.

Figure 17:
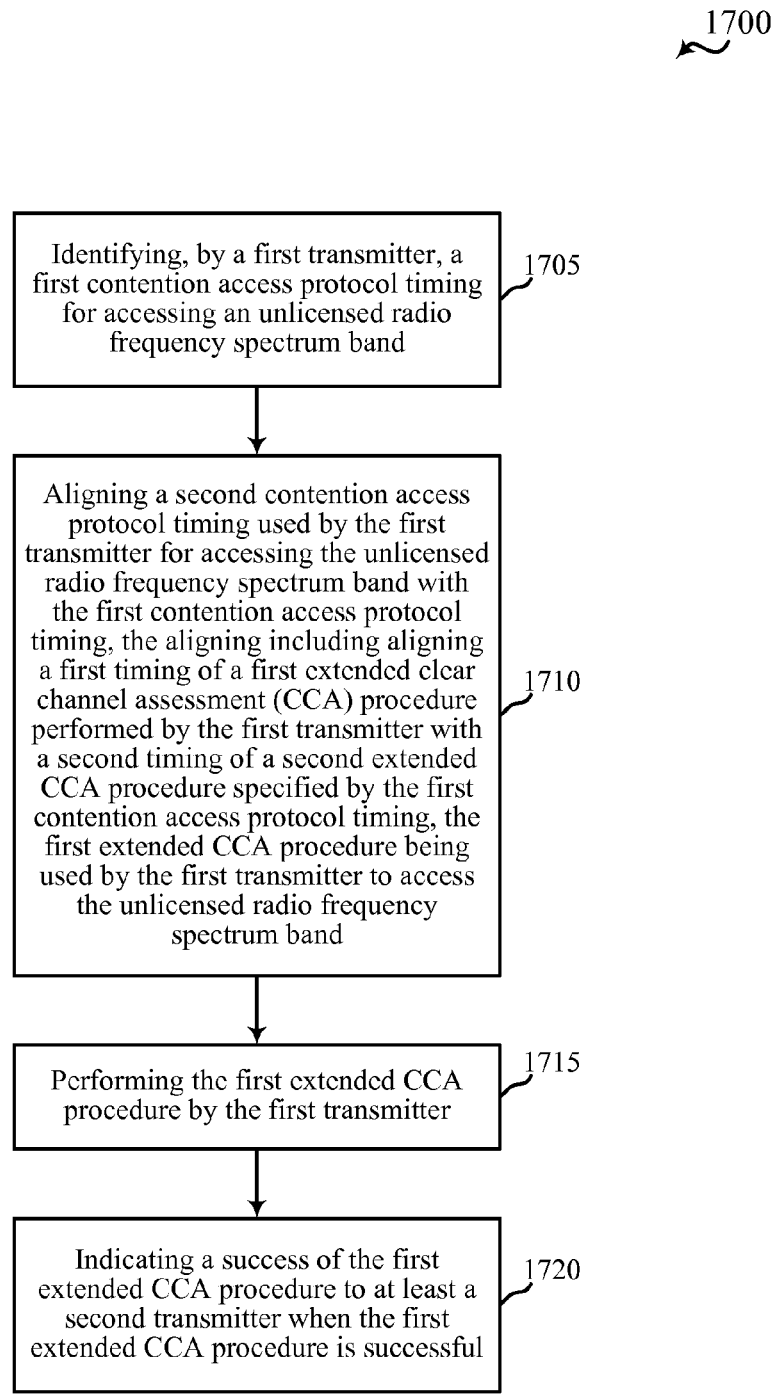
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 205, 205-a, or 1405 described with reference to FIG. 1, 2, or 14, or aspects of one or more of the apparatuses 905, 1005, 1105, 1205, or 1305 described with reference to FIG. 9, 10, 11, 12, or 13. In some examples, a base station or apparatus may execute one or more sets of codes to control the functional elements of the base station or apparatus to perform the functions described below.

At block 1705, the method 1700 may include identifying, by a first transmitter, a first contention access protocol timing for accessing an unlicensed radio frequency spectrum band. In some examples, the first transmitter may include an LTE/LTE-A eNB or LTE/LTE-A base station. In some examples, the first contention access protocol may include an LBT-LBE protocol. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

In some examples of the method 1700, the first contention access protocol may be performed by a second transmitter. In some examples, the first transmitter and the second transmitter may be associated with a same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

The operation(s) at block 1705 may be performed using the wireless communication management module 920, 1020, 1120, 1220, 1320, or 1460 described with reference to FIG. 9, 10, 11, 12, 13, or 14, or the protocol identification module 935, 1035, 1135, 1235, or 1335 described with reference to FIG. 9, 10, 11, 12, or 13.

At block 1710, the method 1700 may include aligning a second contention access protocol timing with the first contention access protocol timing. The second contention access protocol timing may be used by the first transmitter for accessing the unlicensed radio frequency spectrum band. The aligning may include aligning a first timing of a first extended CCA procedure performed by the first transmitter with a second timing of a second extended CCA procedure indicated by the first contention access protocol timing. The first extended CCA procedure may be used by the first transmitter to access the unlicensed radio frequency spectrum band. In some examples, the second contention access protocol may include an LBT-LBE protocol.

In some examples of the operation(s) at block 1710, the aligning the first timing of the first extended CCA procedure with the second timing of the second extended CCA procedure may include aligning a commencement of the first extended CCA procedure with a commencement of the second extended CCA procedure.

In some examples of the operation(s) at block 1710, the aligning the first timing of the first extended CCA procedure with the second timing of the second extended CCA procedure may include aligning the first timing of the first extended CCA procedure with a synchronization boundary occurring once every M radio frames in the first contention access protocol timing. In some examples, M may be equal to one, as described, for example, with reference to FIGS. 4-7. In other examples, M may be an integer greater than one, as described, for example, with reference to FIG. 8.

In some examples of the operation(s) at block 1710, the aligning the first timing of the first extended CCA procedure with the second timing of the second extended CCA procedure may include syncing a first random number generator on which the first extended CCA procedure is based with a second random number generator on which the second extended CCA procedure is based The operation(s) at block 1710 may be performed using the wireless communication management module 920, 1020, 1120, 1220, 1320, or 1460 described with reference to FIG. 9, 10, 11, 12, 13, or 14, the protocol alignment module 940, 1040, 1140, 1240, or 1340 described with reference to FIG. 9, 10, 11, 12, or 13, or the extended CCA procedure alignment module 1145 described with reference to FIG. 11.

At block 1715, the method 1700 may include performing the first extended CCA procedure by the first transmitter. The operation(s) at block 1715 may be performed using the wireless communication management module 920, 1020, 1120, 1220, 1320, or 1460 described with reference to FIG. 9, 10, 11, 12, 13, or 14, or the CCA module 1150, 1255, or 1355 described with reference to FIG. 11, 12, or 13.

At block 1720, and when the first extended CCA procedure is successful, the method 1700 may include indicating a success of the first extended CCA procedure to at least a second transmitter. The success may be indicated, for example, via a backhaul to which the first transmitter and at least the second transmitter are connected. In some examples, the operation(s) at block 1720 may also or alternately include indicating a completion of a transmission by the first node to at least the second transmitter. The completion may be indicated, for example, via the backhaul to which the first transmitter and at least the second transmitter are connected. In some examples, the at least second transmitter may be a node (e.g., a neighboring node) associated with a same operator as the first node. The operation(s) at block 1720 may be performed using the wireless communication management module 920, 1020, 1120, 1220, 1320, or 1460 described with reference to FIG. 9, 10, 11, 12, 13, or 14, or the notification module 1155 described with reference to FIG. 11.

In some examples of the method 1700, the first transmitter and at least a second transmitter may be associated with a same operator, and the method 1700 may include aligning at least a third contention access protocol timing used by at least the second transmitter with the first contention access protocol timing. The at least third contention access protocol timing may be used by the at least second transmitter. In some examples, the aligning of at least a third contention access protocol timing with the first contention access protocol may include aligning at least a third timing of at least a third extended CCA procedure performed by the at least third transmitter with the second timing of the second extended CCA procedure indicated by the first contention access protocol timing. The at least third extended CCA procedure may be used by the at least second transmitter to access the unlicensed radio frequency spectrum band.

Thus, the method 1700 may provide for wireless communication. It should be noted that the method 1700 is just one implementation and that the operations of the method 1700 may be rearranged or otherwise modified such that other implementations are possible.

Figure 18:
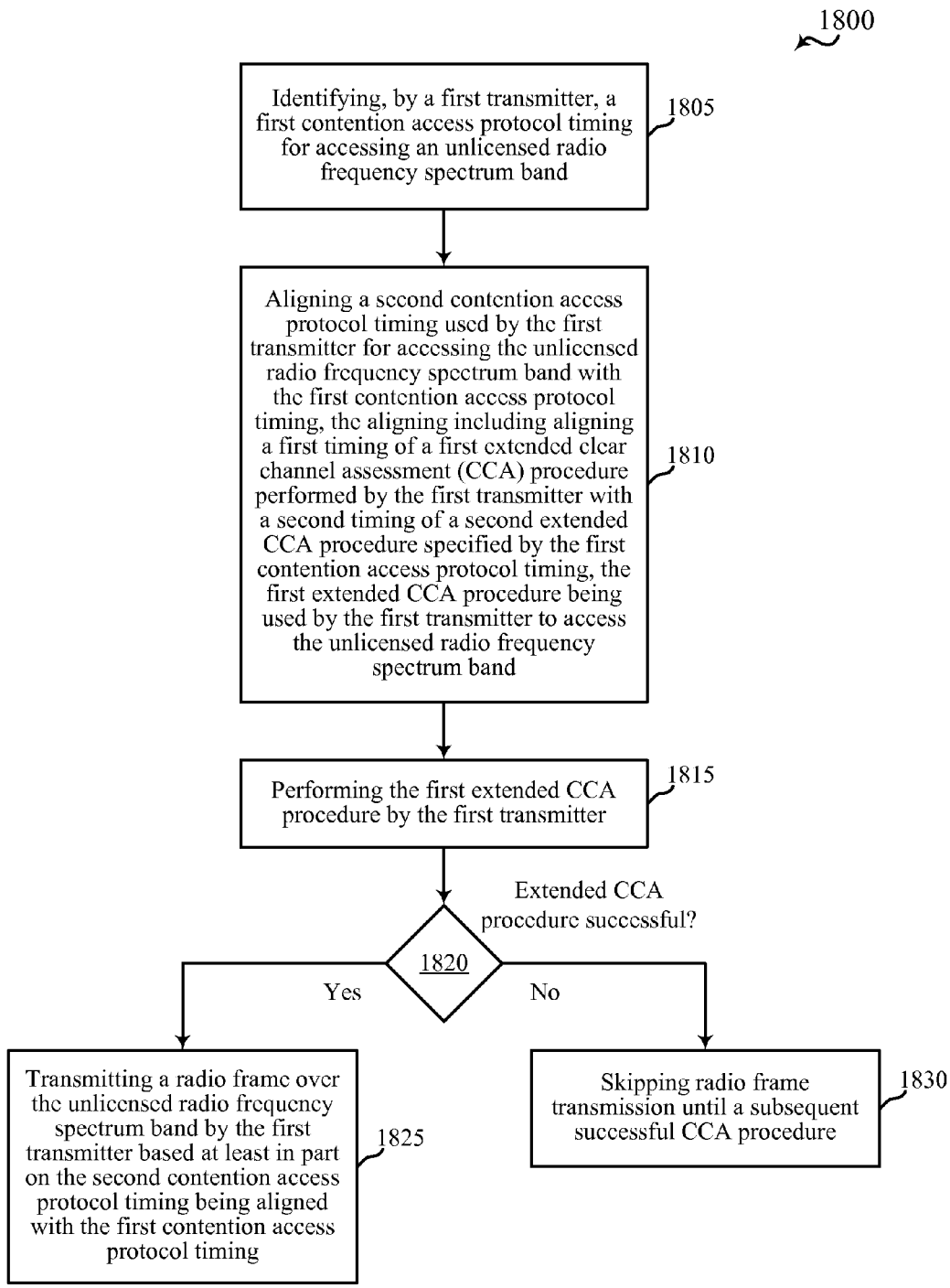
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105, 205, 205-*a*, or 1405 described with reference to FIG. 1, 2, or 14, or aspects of one or more of the apparatuses 905, 1005, 1105, 1205, or 1305 described with reference to FIG. 9, 10, 11, 12, or 13. In some examples, a base station or apparatus may execute one or more sets of codes to control the functional elements of the base station or apparatus to perform the functions described below.

At block 1805, the method 1800 may include identifying, by a first transmitter, a first contention access protocol timing for accessing an unlicensed radio frequency spectrum band. In some examples, the first transmitter may include an LTE/LTE-A eNB or LTE/LTE-A base station. In some examples, the first contention access protocol may include an LBT-LBE protocol. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

In some examples of the method 1800, the first contention access protocol may be performed by a second transmitter. In some examples, the first transmitter and the second transmitter may be associated with a same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

The operation(s) at block 1805 may be performed using the wireless communication management module 920, 1020, 1120, 1220, 1320, or 1460 described with reference to FIG. 9, 10, 11, 12, 13, or 14, or the protocol identification module 935, 1035, 1135, 1235, or 1335 described with reference to FIG. 9, 10, 11, 12, or 13.

At block 1810, the method 1800 may include aligning a second contention access protocol timing with the first contention access protocol timing. The second contention access protocol timing may be used by the first transmitter for accessing the unlicensed radio frequency spectrum band. The aligning may include aligning a first timing of a first extended CCA procedure performed by the first transmitter with a second timing of a second extended CCA procedure indicated by the first contention access protocol timing. The first extended CCA procedure may be used by the first transmitter to access the unlicensed radio frequency spectrum band. In some examples, the second contention access protocol may include an LBT-LBE protocol.

In some examples of the operation(s) at block 1810, the aligning the first timing of the first extended CCA procedure with the second timing of the second extended CCA procedure may include aligning a commencement of the first extended CCA procedure with a commencement of the second extended CCA procedure.

In some examples of the operation(s) at block 1810, the aligning the first timing of the first extended CCA procedure with the second timing of the second extended CCA procedure may include aligning the first timing of the first extended CCA procedure with a synchronization boundary occurring once every M radio frames in the first contention access protocol timing. In some examples, M may be equal to one, as described, for example, with reference to FIGS. 4-7. In other examples, M may be an integer greater than one, as described, for example, with reference to FIG. 8.

In some examples of the operation(s) at block 1810, the aligning the first timing of the first extended CCA procedure with the second timing of the second extended CCA procedure may include syncing a first random number generator on which the first extended CCA procedure is based with a second random number generator on which the second extended CCA procedure is based The operation(s) at block 1810 may be performed using the wireless communication management module 920, 1020, 1120, 1220, 1320, or 1460 described with reference to FIG. 9, 10, 11, 12, 13, or 14, the protocol alignment module 940, 1040, 1140, 1240, or 1340 described with reference to FIG. 9, 10, 11, 12, or 13, or the extended CCA procedure alignment module 1145 described with reference to FIG. 11.

At block 1815, the method 1800 may include performing the first extended CCA procedure by the first transmitter. When it is determined at block 1820 that the first extended CCA procedure is successful, the method 1800 may proceed to block 1825. Otherwise, the method 1800 may proceed to block 1830. In some examples, a success of the first extended CCA procedure may be indicated to at least a second transmitter. The success may be indicated, for example, via a backhaul to which the first transmitter and at least the second transmitter are connected.

The operation(s) at block 1815 or 1820 may be performed using the wireless communication management module 920, 1020, 1120, 1220, 1320, or 1460 described with reference to FIG. 9, 10, 11, 12, 13, or 14, or the CCA module 1150, 1255, or 1355 described with reference to FIG. 11, 12, or 13.

At block 1825, the method 1800 may include transmitting a radio frame (e.g., a virtual radio frame) over the unlicensed radio frequency spectrum band by the first transmitter based at least in part on the second contention access protocol timing being aligned with the first contention access protocol timing. The transmitting the radio frame based at least in part on the second contention access protocol timing being aligned with the first contention access protocol timing may include, for example, adjusting a duration of the radio frame to coincide with a radio frame duration indicated by the first contention access protocol timing, transmitting a radio frame having a shortened duration with respect to a radio frame duration indicated by the first contention access protocol timing, or adjusting an ending of the radio frame.

At block 1830, the method 1800 may include skipping radio frame transmission until a subsequent successful CCA procedure (e.g., a subsequent successful CCA procedure or a subsequent successful extended CCA procedure).

The operation(s) at block 1825 or 1830 may be performed using the wireless communication management module 920, 1020, 1120, 1220, 1320, or 1460 described with reference to FIG. 9, 10, 11, 12, 13, or 14, or the radio frame transmission module 1260 or 1365 described with reference to FIG. 12 or 13.

In some examples of the method 1800, the first transmitter and at least a second transmitter may be associated with a same operator, and the method 1800 may include aligning at least a third contention access protocol timing used by at least the second transmitter with the first contention access protocol timing. The at least third contention access protocol timing may be used by the at least second transmitter. In some examples, the aligning of at least a third contention access protocol timing with the first contention access protocol may include aligning at least a third timing of at least a third extended CCA procedure performed by the at least third transmitter with the second timing of the second extended CCA procedure indicated by the first contention access protocol timing. The at least third extended CCA procedure may be used by the at least second transmitter to access the unlicensed radio frequency spectrum band.

Thus, the method 1800 may provide for wireless communication. It should be noted that the method 1800 is just one implementation and that the operations of the method 1800 may be rearranged or otherwise modified such that other implementations are possible.

Figure 19:
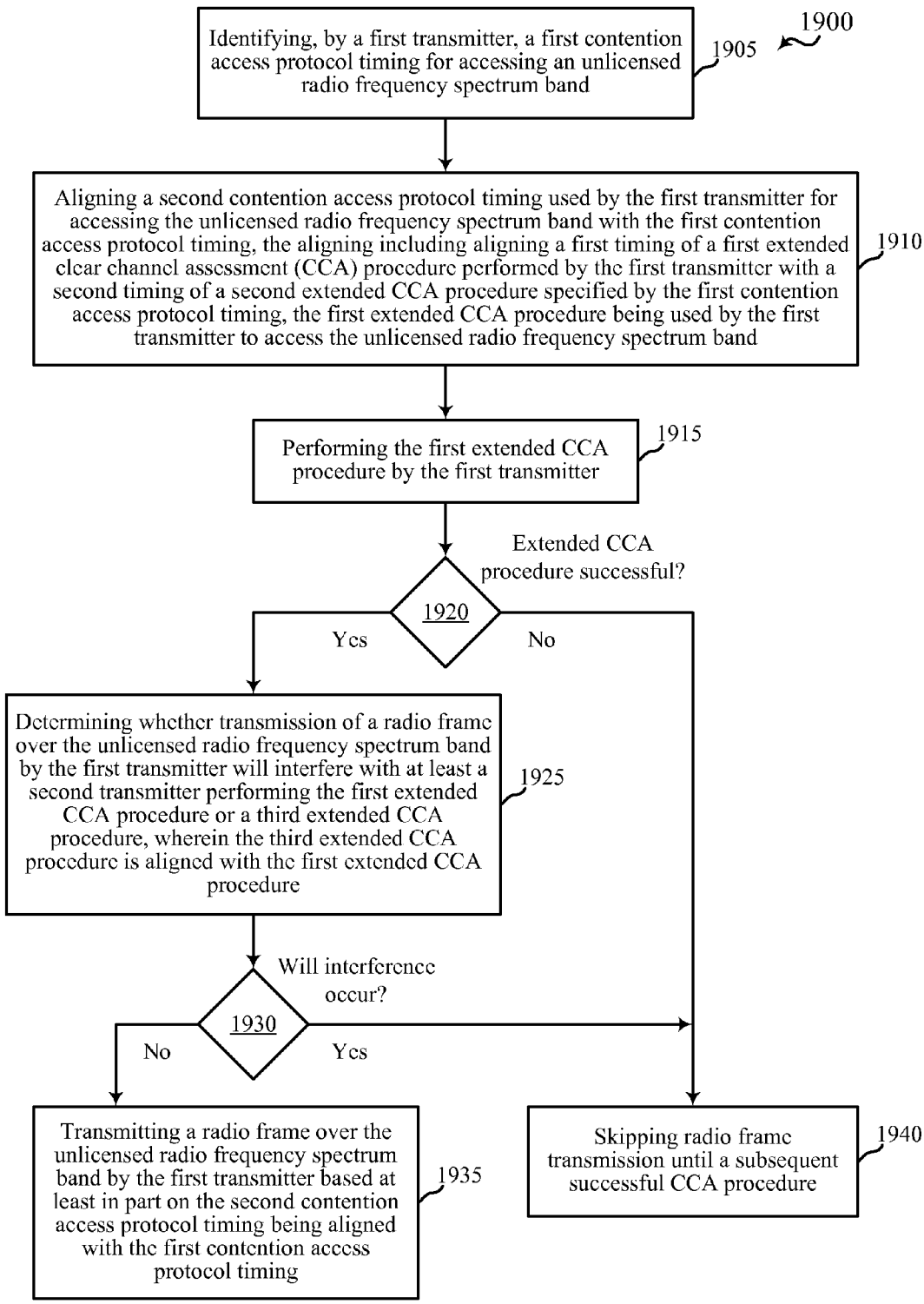
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the base stations 105, 205, 205-a, or 1405 described with reference to FIG. 1, 2, or 14, or aspects of one or more of the apparatuses 905, 1005, 1105, 1205, or 1305 described with reference to FIG. 9, 10, 11, 12, or 13. In some examples, a base station or apparatus may execute one or more sets of codes to control the functional elements of the base station or apparatus to perform the functions described below.

At block 1905, the method 1900 may include identifying, by a first transmitter, a first contention access protocol timing for accessing an unlicensed radio frequency spectrum band. In some examples, the first transmitter may include an LTE/LTE-A eNB or LTE/LTE-A base station. In some examples, the first contention access protocol may include an LBT-LBE protocol. In some examples, the unlicensed radio frequency spectrum band may be a radio frequency spectrum band for which apparatuses may contend for access because the radio frequency spectrum band is available, at least in part, for unlicensed use (e.g., Wi-Fi use or LTE/LTE-A use in an unlicensed radio frequency spectrum band).

In some examples of the method 1900, the first contention access protocol may be performed by a second transmitter. In some examples, the first transmitter and the second transmitter may be associated with a same operator. In some examples, the first contention access protocol may be a reference contention access protocol. In some examples, the first contention access protocol timing may indicate a timing of radio frame transmissions (e.g., virtual radio frame transmissions) based at least in part on a continuum of successful extended CCA procedures and a fixed number of CCA procedures per extended CCA procedure.

The operation(s) at block 1905 may be performed using the wireless communication management module 920, 1020, 1120, 1220, 1320, or 1460 described with reference to FIG. 9, 10, 11, 12, 13, or 14, or the protocol identification module 935, 1035, 1135, 1235, or 1335 described with reference to FIG. 9, 10, 11, 12, or 13.

At block 1910, the method 1900 may include aligning a second contention access protocol timing with the first contention access protocol timing. The second contention access protocol timing may be used by the first transmitter for accessing the unlicensed radio frequency spectrum band. The aligning may include aligning a first timing of a first extended CCA procedure performed by the first transmitter with a second timing of a second extended CCA procedure indicated by the first contention access protocol timing. The first extended CCA procedure may be used by the first transmitter to access the unlicensed radio frequency spectrum band. In some examples, the second contention access protocol may include an LBT-LBE protocol.

In some examples of the operation(s) at block 1910, the aligning the first timing of the first extended CCA procedure with the second timing of the second extended CCA procedure may include aligning a commencement of the first extended CCA procedure with a commencement of the second extended CCA procedure.

In some examples of the operation(s) at block 1910, the aligning the first timing of the first extended CCA procedure with the second timing of the second extended CCA procedure may include aligning the first timing of the first extended CCA procedure with a synchronization boundary occurring once every M radio frames in the first contention access protocol timing. In some examples, M may be equal to one, as described, for example, with reference to FIGS. 4-7. In other examples, M may be an integer greater than one, as described, for example, with reference to FIG. 8.

In some examples of the operation(s) at block 1910, the aligning the first timing of the first extended CCA procedure with the second timing of the second extended CCA procedure may include syncing a first random number generator on which the first extended CCA procedure is based with a second random number generator on which the second extended CCA procedure is based The operation(s) at block 1910 may be performed using the wireless communication management module 920, 1020, 1120, 1220, 1320, or 1460 described with reference to FIG. 9, 10, 11, 12, 13, or 14, the protocol alignment module 940, 1040, 1140, 1240, or 1340 described with reference to FIG. 9, 10, 11, 12, or 13, or the extended CCA procedure alignment module 1145 described with reference to FIG. 11.

At block 1915, the method 1900 may include performing the first extended CCA procedure by the first transmitter. When it is determined at block 1920 that the first extended CCA procedure is successful, the method 1900 may proceed to block 1925. Otherwise, the method 1900 may proceed to block 1940. In some examples, a success of the first extended CCA procedure may be indicated to at least a second transmitter. The success may be indicated, for example, via a backhaul to which the first transmitter and at least the second transmitter are connected.

The operation(s) at block 1915 or 1920 may be performed using the wireless communication management module 920, 1020, 1120, 1220, 1320, or 1460 described with reference to FIG. 9, 10, 11, 12, 13, or 14, or the CCA module 1150, 1255, or 1355 described with reference to FIG. 11, 12, or 13.

At block 1925, the method 1900 may include determining whether transmission of a radio frame (e.g., a virtual radio frame) over the unlicensed radio frequency spectrum band by the first transmitter will interfere with at least a second transmitter performing the second extended CCA procedure or a third extended CCA procedure, where the third extended CCA procedure is aligned with the first extended CCA procedure. In some examples, the determining whether transmission of the radio frame over the unlicensed radio frequency spectrum band by the first transmitter will interfere with at least the second transmitter performing the second extended CCA procedure or the third extended CCA procedure may include syncing a first random number generator on which the first extended CCA procedure is based with a second random number generator on which the second extended CCA procedure is based. That is, the syncing of the random number generators may be used to determine whether an interference condition exists.

When it is determined at block 1930 that the transmission of the radio frame will not interfere with at least the second transmitter performing the first extended CCA procedure or a third extended CCA procedure, the method 1900 may proceed to block 1935. Otherwise, the method 1900 may proceed to block 1940. The operation(s) at block 1925 or 1930 may be performed using the wireless communication management module 920, 1020, 1120, 1220, 1320, or 1460 described with reference to FIG. 9, 10, 11, 12, 13, or 14, or the interference determination module 1360 described with reference to FIG. 13.

At block 1935, the method 1900 may transmitting the radio frame over the unlicensed radio frequency spectrum band by the first transmitter based at least in part on the second contention access protocol timing being aligned with the first contention access protocol timing. The transmitting the radio frame based at least in part on the second contention access protocol timing being aligned with the first contention access protocol timing may include, for example, adjusting a duration of the radio frame to coincide with a radio frame duration indicated by the first contention access protocol timing, transmitting a radio frame having a shortened duration with respect to a radio frame duration indicated by the first contention access protocol timing, or adjusting an ending of the radio frame.

At block 1940, the method 1900 may include skipping radio frame transmission until a subsequent successful CCA procedure (e.g., a subsequent successful CCA procedure or a subsequent successful extended CCA procedure).

The operation(s) at block 1935 or 1940 may be performed using the wireless communication management module 920, 1020, 1120, 1220, 1320, or 1460 described with reference to FIG. 9, 10, 11, 12, 13, or 14, or the radio frame transmission module 1260 or 1365 described with reference to FIG. 12 or 13.

In some examples of the method 1900, the first transmitter and at least a second transmitter may be associated with a same operator, and the method 1900 may include aligning at least a third contention access protocol timing used by at least the second transmitter with the first contention access protocol timing. The at least third contention access protocol timing may be used by the at least second transmitter. In some examples, the aligning of at least a third contention access protocol timing with the first contention access protocol may include aligning at least a third timing of at least a third extended CCA procedure performed by the at least third transmitter with the second timing of the second extended CCA procedure indicated by the first contention access protocol timing. The at least third extended CCA procedure may be used by the at least second transmitter to access the unlicensed radio frequency spectrum band.

Thus, the method 1900 may provide for wireless communication. It should be noted that the method 1900 is just one implementation and that the operations of the method 1900 may be rearranged or otherwise modified such that other implementations are possible.

In some examples, aspects from two or more of the methods 1500, 1600, 1700, 1800, or 1900 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
identifying, by a first transmitter, a first contention access protocol timing for accessing an unlicensed radio frequency spectrum band; and
aligning a second contention access protocol timing with the first contention access protocol timing, the second contention access protocol timing being used by the first transmitter for accessing the unlicensed radio frequency spectrum band,
wherein the aligning the second contention access protocol timing with the first contention access protocol timing comprises adjusting a timing of radio frame transmissions by the first transmitter in the unlicensed radio frequency spectrum band based at least in part on the first contention access protocol timing,
wherein the adjusting the timing of radio frame transmissions by the first transmitter comprises:
adjusting a duration of at least one radio frame transmitted by the first transmitter to coincide with a radio frame duration indicated by the first contention access protocol timing, or
adjusting a radio frame ending of at least one radio frame transmitted by the first transmitter to coincide with a radio frame ending indicated by the first contention access protocol timing, or
shortening a duration of at least one radio frame transmitted by the first transmitter with respect to a radio frame duration indicated by the first contention access protocol timing, or
skipping at least one radio frame transmission indicated by the first contention access protocol timing.

2. The method of claim 1, wherein the first contention access protocol timing is performed by a second transmitter.

3. The method of claim 2, wherein the first transmitter and the second transmitter are associated with a same operator.

4. The method of claim 1, wherein the first contention access protocol timing indicates a timing of radio frame transmissions based at least in part on a continuum of successful extended CCA procedures and a fixed number of CCA procedures per extended CCA procedure.

5. A method for wireless communication, comprising:
identifying, by a first transmitter, a first contention access protocol timing for accessing an unlicensed radio frequency spectrum band; and
aligning a second contention access protocol timing with the first contention access protocol timing, the second contention access protocol timing being used by the first transmitter for accessing the unlicensed radio frequency spectrum band,
wherein the aligning the second contention access protocol timing with the first contention access protocol timing comprises aligning a first timing of a first extended clear channel assessment (CCA) procedure performed by the first transmitter with a second timing of a second extended CCA procedure indicated by the first contention access protocol timing, the first extended CCA procedure being used by the first transmitter to access the unlicensed radio frequency spectrum band,
wherein the aligning the first timing of the first extended CCA procedure with the second timing of the second extended CCA procedure comprises:
aligning a commencement of the first extended CCA procedure with a commencement of the second extended CCA procedure, or
syncing a first random number generator on which the first extended CCA procedure is based with a second random number generator on which the second extended CCA procedure is based.

6. The method of claim 5, further comprising:
performing the first extended CCA procedure by the first transmitter; and
when the first extended CCA procedure is successful, transmitting a virtual radio frame over the unlicensed radio frequency spectrum band by the first transmitter based at least in part on the second contention access protocol timing being aligned with the first contention access protocol timing.

7. The method of claim 6, wherein the transmitting the virtual radio frame based at least in part on the second contention access protocol timing being aligned with the first contention access protocol timing comprises:
transmitting a virtual radio frame having a shortened duration with respect to a radio frame duration indicated by the first contention access protocol timing.

8. The method of claim 5, further comprising:
performing the first extended CCA procedure by the first transmitter;
when the first extended CCA procedure is successful, determining whether transmission of a virtual radio frame over the unlicensed radio frequency spectrum band by the first transmitter will interfere with at least a second transmitter performing the first extended CCA procedure or a third extended CCA procedure, wherein the third extended CCA procedure is aligned with the first extended CCA procedure; and
transmitting the virtual radio frame over the unlicensed radio frequency spectrum band by the first transmitter, after determining that transmission of the virtual radio frame over the unlicensed radio frequency spectrum band by the first transmitter will not interfere with at least the second transmitter performing the second extended CCA procedure or the third extended CCA procedure, based at least in part on the second contention access protocol timing being aligned with the first contention access protocol timing.

9. The method of claim 8, further comprising:
skipping virtual radio frame transmission until a subsequent successful CCA procedure after determining that transmission of the virtual radio frame over the unlicensed radio frequency spectrum band will interfere with at least the second transmitter performing the second extended CCA procedure or the third extended CCA procedure.

10. The method of claim 8, further comprising:
skipping virtual radio frame transmission until a subsequent successful CCA procedure when the first extended CCA procedure fails.

11. The method of claim 8, wherein the determining whether transmission of a virtual radio frame over the unlicensed radio frequency spectrum band by the first transmitter will interfere with at least the second transmitter performing the first extended CCA procedure or the third extended CCA procedure comprises:
syncing a first random number generator on which the first extended CCA procedure is based with a second random number generator on which the second extended CCA procedure is based.

12. The method of claim 5, wherein the aligning the first timing of the first extended CCA procedure with the second timing of the second extended CCA procedure comprises:
aligning the first timing of the first extended CCA procedure with a synchronization boundary occurring once every M radio frames in the first contention access protocol timing.

13. The method of claim 12, wherein M equals one.

14. The method of claim 12, wherein M is an integer greater than one.

15. The method of claim 5, further comprising:
performing the first extended CCA procedure by the first transmitter; and
indicating a success of the first extended CCA procedure to at least a second transmitter when the first extended CCA procedure is successful.

16. The method of claim 15, wherein the success of the first extended CCA procedure is indicated to at least the second transmitter via a backhaul to which the first transmitter and at least the second transmitter are connected.

17. An apparatus for wireless communication, comprising:
a processor;
memory in electronic communication with the processor; and
instructions stored in the memory, the instructions being executable by the processor to:
identify, by a first transmitter, a first contention access protocol timing for accessing an unlicensed radio frequency spectrum band; and
align a second contention access protocol timing with the first contention access protocol timing, the second contention access protocol timing being used by the first transmitter for accessing the unlicensed radio frequency spectrum band,
wherein the instructions executable by the processor to align the second contention access protocol timing with the first contention access protocol timing comprise instructions executable by the processor to adjust a timing of radio frame transmissions by the first transmitter in the unlicensed radio frequency spectrum band based at least in part on the first contention access protocol timing,
wherein the instructions executable by the processor to adjust the timing of radio frame transmissions by the first transmitter comprise instructions executable by the processor to:
adjust a duration of at least one radio frame transmitted by the first transmitter to coincide with a radio frame duration indicated by the first contention access protocol timing, or
adjust a radio frame ending of at least one radio frame transmitted by the first transmitter to coincide with a radio frame ending indicated by the first contention access protocol timing, or
shorten a duration of at least one radio frame transmitted by the first transmitter with respect to a radio frame duration indicated by the first contention access protocol timing, or
skip at least one radio frame transmission indicated by the first contention access protocol timing.

18. The apparatus of claim 5, wherein the first contention access protocol timing indicates a timing of virtual radio frame transmissions based at least in part on a continuum of successful extended CCA procedures and a fixed number of CCA procedures per extended CCA procedure.

19. The apparatus of claim 17, wherein the first contention access protocol timing is performed by a second transmitter.

20. The apparatus of claim 19, wherein the first transmitter and the second transmitter are associated with a same operator.

21. An apparatus for wireless communication, comprising:
a processor;
memory in electronic communication with the processor; and
instructions stored in the memory, the instructions being executable by the processor to:
identify, by a first transmitter, a first contention access protocol timing for accessing an unlicensed radio frequency spectrum band; and
align a second contention access protocol timing with the first contention access protocol timing, the second contention access protocol timing being used by the first transmitter for accessing the unlicensed radio frequency spectrum band,
wherein the instructions executable by the processor to align the second contention access protocol timing with the first contention access protocol timing comprise instructions executable by the processor to align a first timing of a first extended clear channel assessment (CCA) procedure performed by the first transmitter with a second timing of a second extended CCA procedure indicated by the first contention access protocol timing, the first extended CCA procedure being used by the first transmitter to access the unlicensed radio frequency spectrum band,
wherein the instructions executable by the processor to align the first timing of the first extended CCA procedure with the second timing of the second extended CCA procedure comprise instructions executable by the processor to:
align a commencement of the first extended CCA procedure with a commencement of the second extended CCA procedure, or sync a first random number generator on which the first extended CCA procedure is based with a second random number generator on which the second extended CCA procedure is based.

22. The apparatus of claim 21, wherein the instructions are executable by the processor to:
perform the first extended CCA procedure by the first transmitter;
when the first extended CCA procedure is successful, determine whether transmission of a virtual radio frame over the unlicensed radio frequency spectrum band by the first transmitter will interfere with at least a second transmitter performing the first extended CCA procedure or a third extended CCA procedure, wherein the third extended CCA procedure is aligned with the first extended CCA procedure; and
transmit the virtual radio frame over the unlicensed radio frequency spectrum band by the first transmitter, after determining that transmission of the virtual radio frame over the unlicensed radio frequency spectrum band by the first transmitter will not interfere with at least the second transmitter performing the second extended CCA procedure or the third extended CCA procedure, based at least in part on the second contention access protocol timing being aligned with the first contention access protocol timing.

23. The apparatus of claim 22, wherein the instructions executable by the processor to determine whether transmission of a virtual radio frame over the unlicensed radio frequency spectrum band by the first transmitter will interfere with at least the second transmitter performing the second extended CCA procedure or the third extended CCA procedure comprise instructions executable by the processor to:
sync a first random number generator on which the first extended CCA procedure is based with a second random number generator on which the second extended CCA procedure is based.

24. The apparatus of claim 22, wherein the instructions are executable by the processor to:
skip virtual radio frame transmission until a subsequent successful CCA procedure after determining that transmission of the virtual radio frame over the unlicensed radio frequency spectrum band will interfere with at least the second transmitter performing the second extended CCA procedure or the third extended CCA procedure.

25. The apparatus of claim 22, wherein the instructions are executable by the processor to:
skip virtual radio frame transmission until a subsequent successful CCA procedure when the first extended CCA procedure fails.

26. The apparatus of claim 21, wherein the instructions are executable by the processor to:
perform the first extended CCA procedure by the first transmitter; and
indicate a success of the first extended CCA procedure to at least a second transmitter when the first extended CCA procedure is successful.

27. The apparatus of claim 26, wherein the success of the first extended CCA procedure is indicated to at least the second transmitter via a backhaul to which the first transmitter and at least the second transmitter are connected.

28. The apparatus of claim 21, wherein the instructions are executable by the processor to:
perform the first extended CCA procedure by the first transmitter; and
when the first extended CCA procedure is successful, transmitting a virtual radio frame over the unlicensed radio frequency spectrum band by the first transmitter based at least in part on the second contention access protocol timing being aligned with the first contention access protocol timing.

29. The apparatus of claim 28, wherein the instructions executable by the processor to transmit the virtual radio frame based at least in part on the second contention access protocol timing being aligned with the first contention access protocol timing comprise instructions executable by the processor to:
transmit a virtual radio frame having a shortened duration with respect to a radio frame duration indicated by the first contention access protocol timing.

30. The apparatus of claim 21, wherein the instructions executable by the processor to align the first timing of the first extended CCA procedure with the second timing of the second extended CCA procedure comprise instructions executable by the processor to:
align the first timing of the first extended CCA procedure with a synchronization boundary occurring once every M radio frames in the first contention access protocol timing.

31. The apparatus of claim 30, wherein M equals one.

32. The apparatus of claim 30, wherein M is an integer greater than one.

* * * * *